(12) United States Patent
Mizuo

(10) Patent No.: US 9,602,034 B2
(45) Date of Patent: Mar. 21, 2017

(54) MOTOR DRIVE APPARATUS FOR DRIVING STEPPING MOTOR AND CONTROL METHOD THEREFOR

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/265,125

(22) Filed: Apr. 29, 2014

(65) Prior Publication Data

US 2014/0327385 A1 Nov. 6, 2014

(30) Foreign Application Priority Data

May 1, 2013 (JP) ................................. 2013-096522

(51) Int. Cl.
*H02P 8/00* (2006.01)
*H02P 8/36* (2006.01)
*H02P 8/38* (2006.01)

(52) U.S. Cl.
CPC . *H02P 8/36* (2013.01); *H02P 8/38* (2013.01)

(58) Field of Classification Search
CPC ... G02B 7/32; G02B 7/34; G02B 7/36; G02B 7/08; G02B 7/28; B23P 19/066; B25B 21/00; B25B 23/14; B25B 23/147; F02P 15/10; F02P 17/12; F02P 2017/125; F02P 3/0456; G01D 5/2046; G01L 5/24
USPC ... 318/400.11, 400.23, 696, 719; 396/89, 95
See application file for complete search history.

(56) References Cited

U.S. PATENT DOCUMENTS

| | | | | | |
|---|---|---|---|---|---|
| 4,477,757 | A | * | 10/1984 | Palombo et al. ............. | 318/696 |
| 4,575,668 | A | * | 3/1986 | Baker ............... | H02M 7/53873 |
| | | | | | 318/811 |
| 4,629,958 | A | * | 12/1986 | Kurakake ............. | H02P 25/024 |
| | | | | | 318/722 |
| 4,837,492 | A | * | 6/1989 | Kurosawa ............... | G01D 5/244 |
| | | | | | 318/661 |
| 4,866,357 | A | * | 9/1989 | Miller ....................... | B60S 1/08 |
| | | | | | 318/443 |
| 4,967,224 | A | * | 10/1990 | Hamada et al. ................. | 396/95 |
| 4,974,003 | A | * | 11/1990 | Ohnuki et al. ................... | 396/89 |
| 5,012,267 | A | * | 4/1991 | Higashihara .................... | 396/95 |
| 5,072,354 | A | * | 12/1991 | Katto ................ | H02M 7/53803 |
| | | | | | 318/811 |
| 5,089,843 | A | * | 2/1992 | Higashihara et al. .......... | 396/95 |
| 5,157,432 | A | * | 10/1992 | Fukuoka et al. ................. | 396/81 |
| 5,347,355 | A | * | 9/1994 | Eguchi ............... | G01D 5/24404 |
| | | | | | 250/231.16 |

(Continued)

FOREIGN PATENT DOCUMENTS

JP 2-151298 A 6/1990

*Primary Examiner* — Paul Ip
(74) *Attorney, Agent, or Firm* — Canon U.S.A., Inc. IP Division

(57) ABSTRACT

A CPU obtains a difference between a data number at timing when an ENC0 signal or an ENC1 signal changes in a case where there is no follow-up delay of a rotor relative to a voltage signal applied to an A-phase coil and a B-phase coil and a data number at timing when the ENC0 signal or the ENC1 signal changes in a case where there is a follow-up delay of the rotor relative to the voltage signal applied to the A-phase coil and the B-phase coil. Then, the CPU controls the voltage signal applied to the A-phase coil and the B-phase coil based on the obtained difference.

6 Claims, 14 Drawing Sheets

(56) References Cited

U.S. PATENT DOCUMENTS

| | | | | |
|---|---|---|---|---|
| 5,455,491 A * | 10/1995 | Hajagos | H02J 3/1892 | 315/158 |
| 5,583,423 A * | 12/1996 | Bangerter | G05F 1/45 | 323/211 |
| 5,652,504 A * | 7/1997 | Bangerter | G05F 1/45 | 323/211 |
| 5,758,629 A * | 6/1998 | Bahr et al. | | 123/644 |
| 6,057,674 A * | 5/2000 | Bangerter | G05F 1/45 | 323/211 |
| 6,184,932 B1 * | 2/2001 | Tanaka | | 348/347 |
| 6,573,680 B2 * | 6/2003 | Sasama | | 318/696 |
| 6,781,633 B2 * | 8/2004 | Tanaka | | 348/347 |
| 6,864,657 B1 * | 3/2005 | Lungu | H02K 19/103 | 318/400.01 |
| 7,723,940 B2 * | 5/2010 | Tinebor | G05B 23/0256 | 318/565 |
| 7,817,363 B2 * | 10/2010 | O'Brien | G11B 19/048 | 360/25 |
| 7,860,045 B2 * | 12/2010 | Holtzman et al. | | 370/326 |
| 2001/0000435 A1 * | 4/2001 | Tanaka | | 348/358 |
| 2006/0125439 A1 * | 6/2006 | Ajima | B60K 6/26 | 318/716 |
| 2006/0186891 A1 * | 8/2006 | Tinebor | G05B 23/0256 | 324/500 |
| 2007/0132423 A1 * | 6/2007 | Ajima et al. | | 318/719 |
| 2007/0139519 A1 * | 6/2007 | DeCusatis | G02B 27/26 | 348/58 |
| 2007/0139616 A1 * | 6/2007 | DeCusatis | G03B 21/14 | 353/7 |
| 2007/0139617 A1 * | 6/2007 | DeCusatis | G03B 35/00 | 353/7 |
| 2007/0139618 A1 * | 6/2007 | DeCusatis | G03B 21/14 | 353/7 |
| 2007/0139619 A1 * | 6/2007 | DeCusatis | G03B 35/00 | 353/7 |
| 2007/0139624 A1 * | 6/2007 | DeCusatis | G03B 9/10 | 353/84 |
| 2007/0139769 A1 * | 6/2007 | DeCusatis | A63F 13/02 | 359/478 |
| 2007/0295010 A1 * | 12/2007 | Stephens | B64G 1/409 | 60/721 |
| 2008/0315810 A1 * | 12/2008 | Akita | | 318/400.23 |
| 2009/0302797 A1 * | 12/2009 | Nakagawa | G05B 19/416 | 318/632 |
| 2010/0123962 A1 * | 5/2010 | O'Brien | G11B 19/048 | 360/31 |
| 2010/0231695 A1 * | 9/2010 | DeCusatis | G03B 35/00 | 348/51 |
| 2011/0031906 A1 * | 2/2011 | Yasohara | G06F 13/4256 | 318/66 |
| 2011/0260669 A1 * | 10/2011 | Nakahata | H02P 7/29 | 318/503 |
| 2012/0191398 A1 * | 7/2012 | Murakami | G01C 19/5776 | 702/99 |
| 2013/0002178 A1 * | 1/2013 | Endou et al. | | 318/400.11 |

* cited by examiner

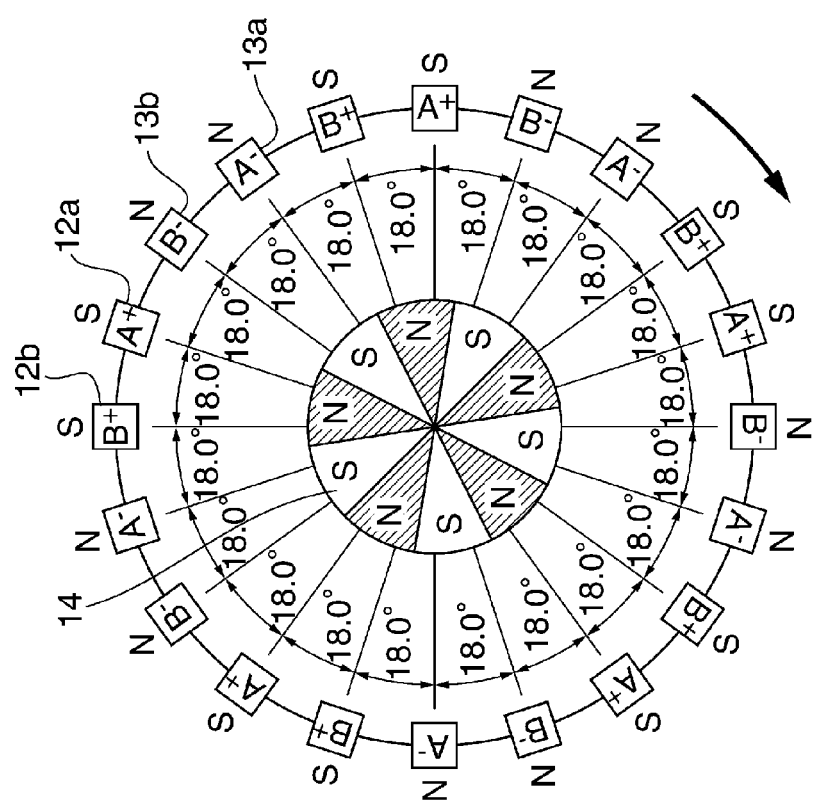
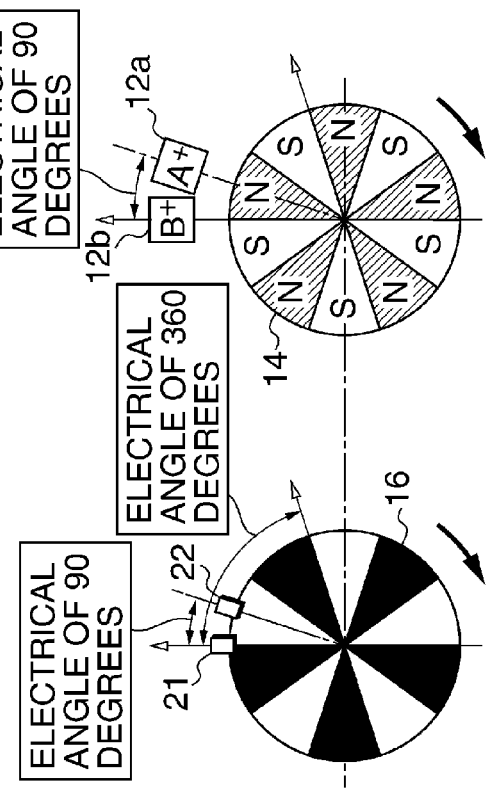
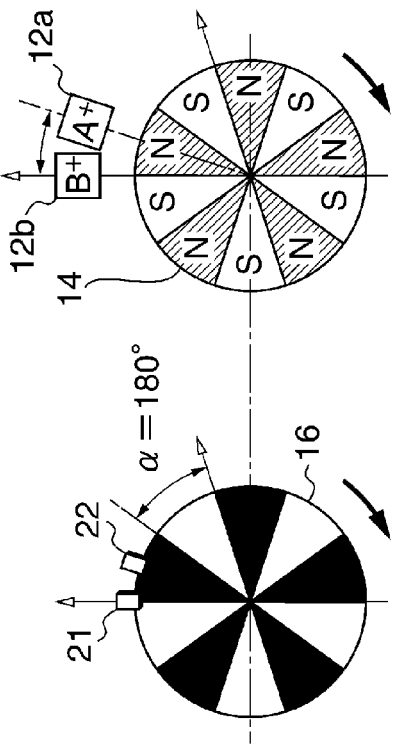

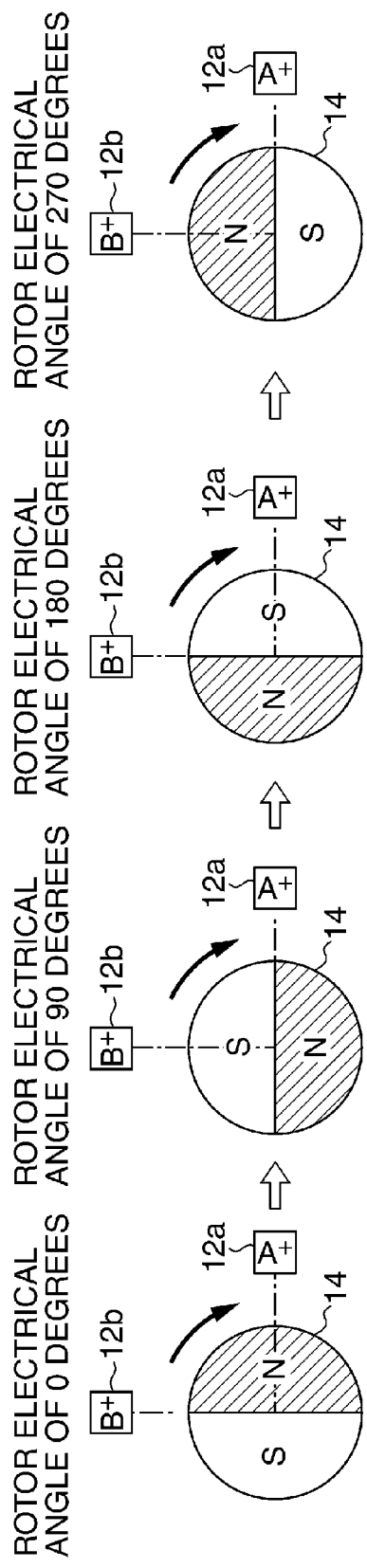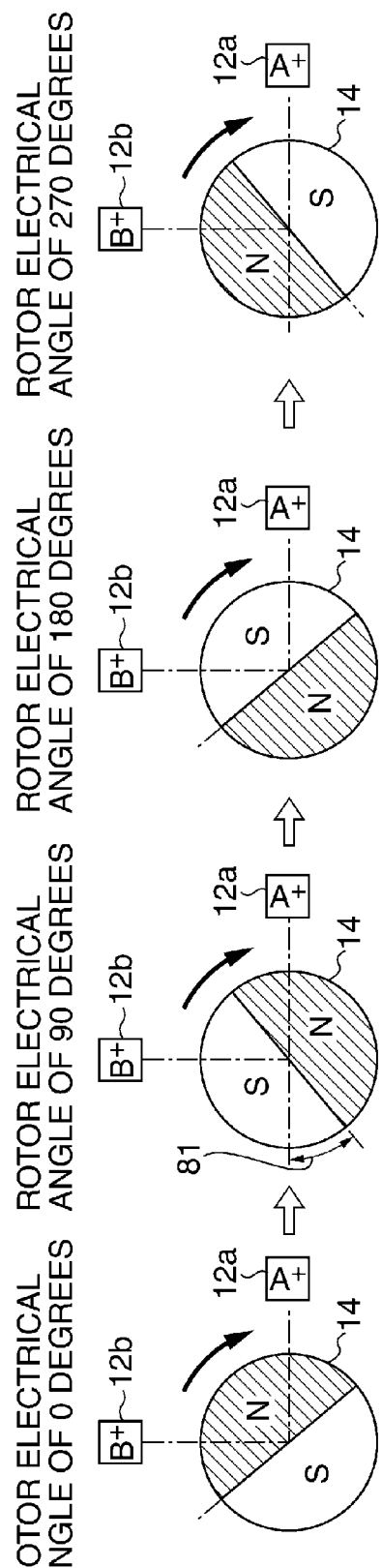

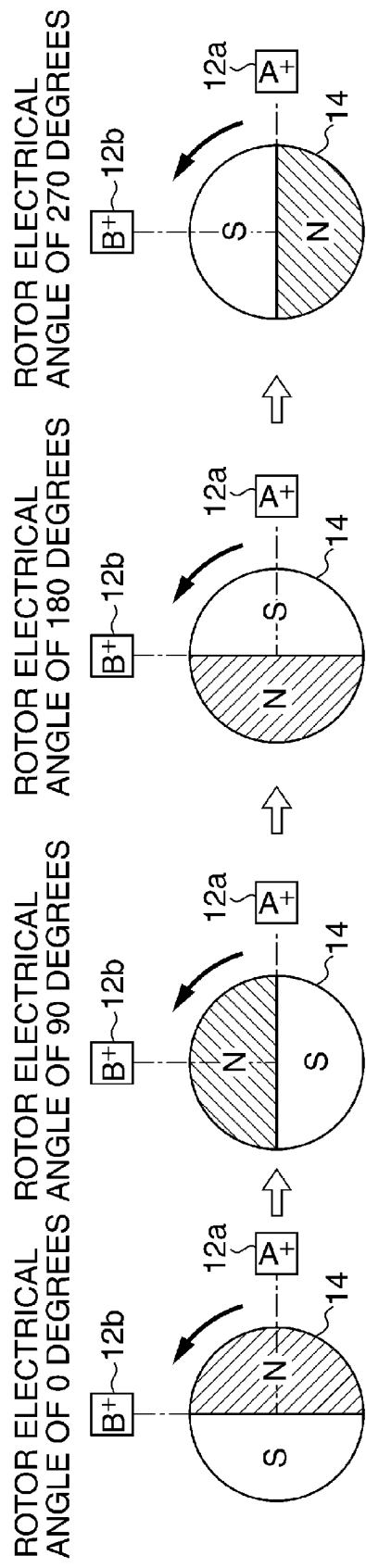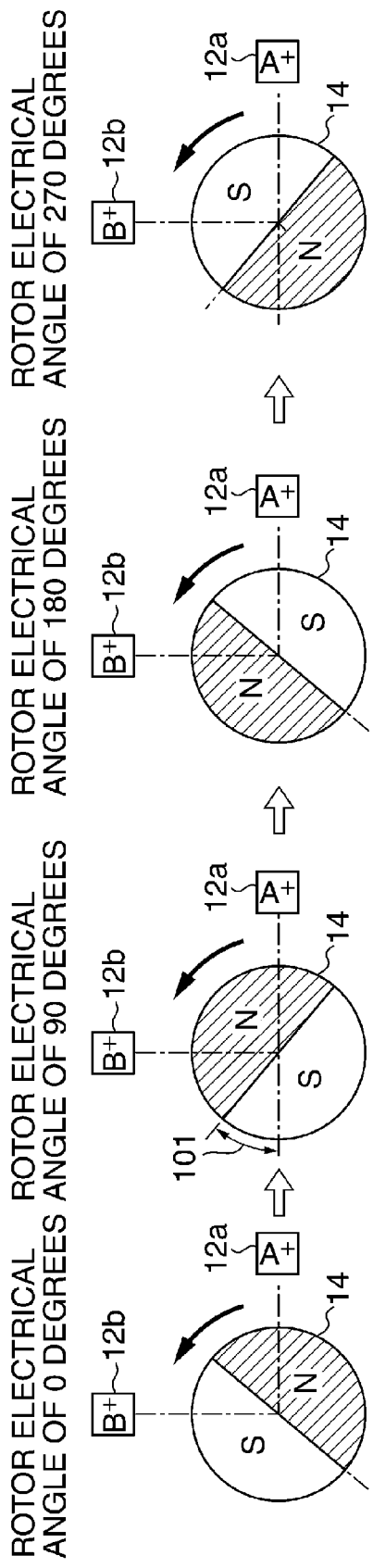

MOTOR DRIVE APPARATUS FOR DRIVING STEPPING MOTOR AND CONTROL METHOD THEREFOR

BACKGROUND OF THE INVENTION

Field of the Invention

The invention relates to a motor drive apparatus for driving a stepping motor and a control method therefor.

Description of the Related Art

Stepping motors have features such as small size, high torque, and long service life, and can easily realize digital positioning by open-loop control. Accordingly, stepping motors are widely used, e.g., for information household appliances, such as cameras and optical disk devices, and used for office automation equipment, such as printers and projectors.

Japanese Patent Application Laid-Open No. 2-151298 discusses a technique to detect step-out of a stepping motor based on a change in rotation speed of the stepping motor or a change in motor current and to set a drive voltage for the stepping motor lower within such a range as not to cause the stepping motor to step out.

SUMMARY OF THE INVENTION

According to an aspect of the invention, a motor drive apparatus includes a stepping motor configured to rotate a rotor by energizing a coil, a drive unit configured to supply, to the coil, a drive signal that periodically changes, a signal output unit configured to output an output signal that changes according to rotation of the rotor, and a control unit configured to control the drive unit, wherein the control unit obtains a difference between a state of the drive signal at timing when the output signal changes in a case where there is no follow-up delay of the rotor relative to the drive signal and a state of the drive signal at timing when the output signal changes in a case where there is a follow-up delay of the rotor relative to the drive signal, and wherein the drive unit controls a voltage of the drive signal based on the difference.

According to an exemplary embodiment of the invention, the drive energy for the stepping motor can be adjusted based on the amount of follow-up delay of the rotor.

Further features of the invention will become apparent from the following description of exemplary embodiments with reference to the attached drawings.

BRIEF DESCRIPTION OF THE DRAWINGS

FIG. 3A is a view showing a construction of a stepping motor driven by the motor drive apparatus.

FIGS. 3B and 3C are views each showing a relation among physical positions of a rotor and stator poles of the stepping motor, a slit rotary plate attached to the rotor, and first and second photointerrupters.

FIG. 8A is a view showing a relation between rotor electrical angle and rotor rotation position in the case without follow-up delay of the rotor relative to sinusoidal voltage signals applied to the stator coils to forwardly rotate the rotor.

FIG. 8B is a view showing a relation between rotor electrical angle and rotor rotation position in the case of the presence of follow-up delay of the rotor relative to the sinusoidal voltage signals.

FIG. 10A is a view showing a relation between rotor electrical angle and rotor rotation position in the case without follow-up delay of the rotor relative to the voltage signals when the rotor is reversely rotated.

FIG. 10B is a view showing a relation between rotor electrical angle and rotor rotation position in the case of the presence of follow-up delay of the rotor relative to the voltage signals when the rotor is reversely rotated.

DESCRIPTION OF THE EMBODIMENTS

Various exemplary embodiments, features, and aspects of the invention will be described in detail below with reference to the drawings.

Figure 1:
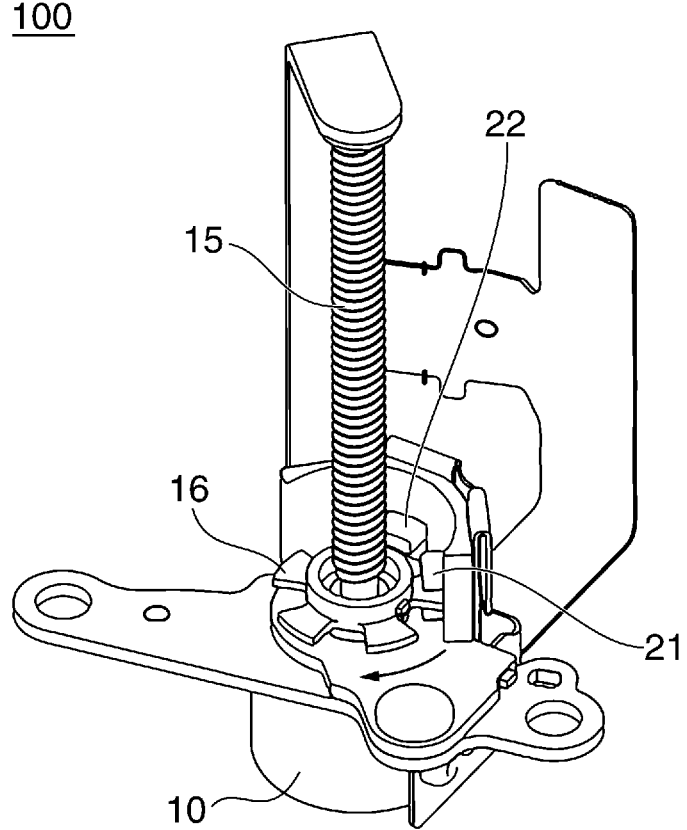
FIG. 1 is a perspective view showing an external construction of a motor drive apparatus according to one embodiment of this invention.

FIG. 1 shows in perspective view an external construction of a motor drive apparatus 100 according to one embodiment of this invention. The motor drive apparatus 100 for driving a stepping motor 10 has a slit rotary plate 16 attached to a rotor shaft 15 of the stepping motor 10, and has first and second photointerrupters 21, 22, which are also referred to as the ch0 and ch1 photointerrupters and denoted by symbols ch0PI, ch1PI in FIG. 2.

In the motor drive apparatus 100, the slit rotary plate 16 is configured to have bright and dark regions whose angle ratio is equal to 50:50. When the stepping motor 10 is driven, the slit rotary plate 16 rotates, and the first and second photointerrupters 21, 22 output respective output signals that change as described later.

Figure 2:
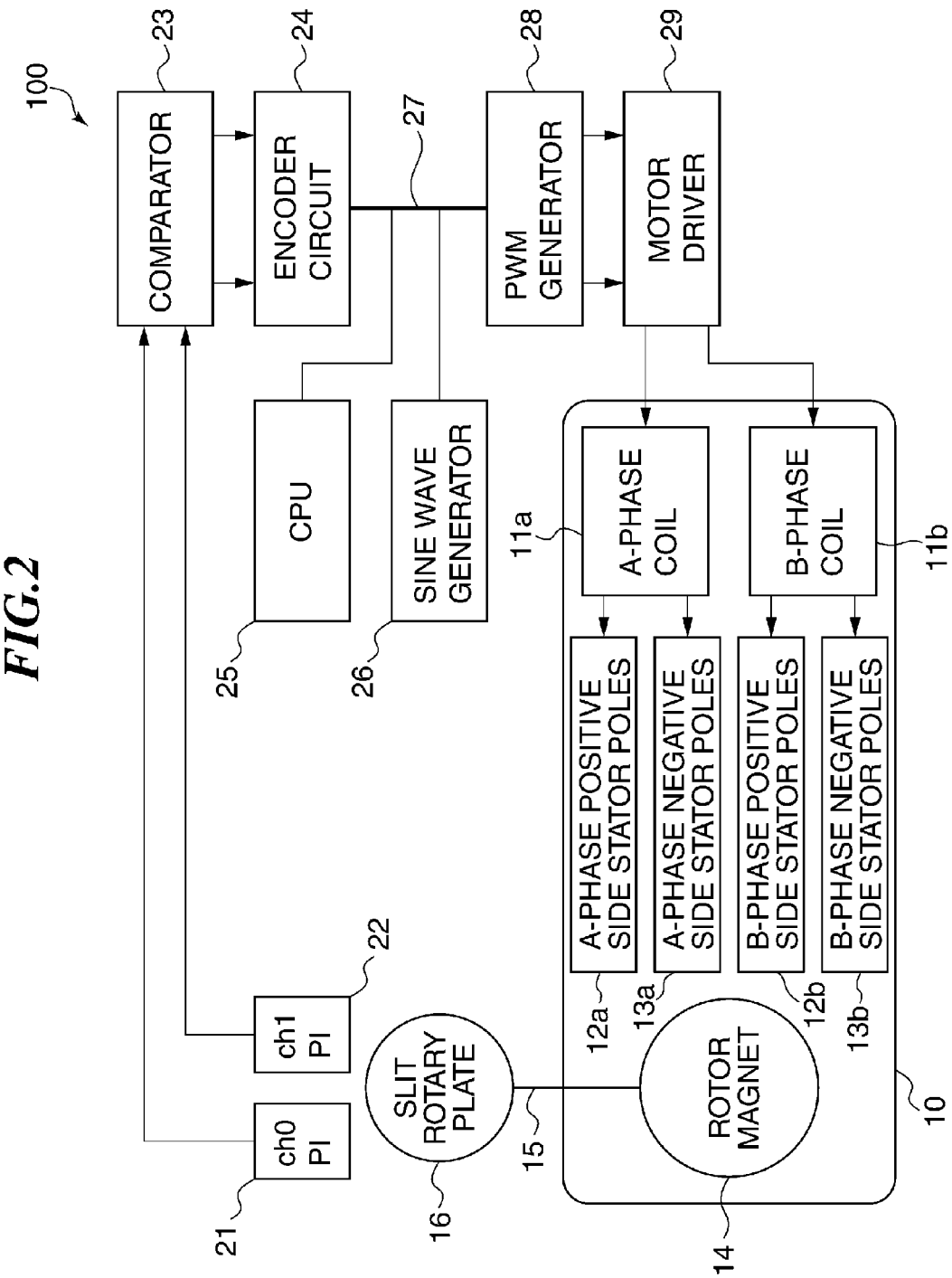
FIG. 2 is a block diagram showing a construction of a motor drive control system of the motor drive apparatus.

FIG. 2 shows in block diagram a construction of a motor drive control system of the motor drive apparatus 100, together with a relevant construction of the stepping motor 10. As shown in FIG. 2, the stepping motor 10 has an A-phase stator coil 11a, a B-phase stator coil 11b, A-phase positive side stator poles 12a, A-phase negative side stator poles 13a, B-phase positive side stator poles 12b, B-phase negative side stator poles 13b, and a rotor magnet 14. When the A-phase coil 11a and/or the B-phase coil 11b is energized, the rotor 14 rotates.

In the following, the A- and B-phase stator coils will be referred to as the A- and B-phase coils, respectively, the rotor magnet will be referred to as the rotor, and the A-phase positive side stator poles, the A-phase negative side stator poles, the B-phase positive side stator poles, and the B-phase negative side stator poles will be sometimes collectively referred to as the stator poles.

In the motor drive apparatus 100, a comparator 23 receives analog signals from the first and second photointerrupters 21, 22, binarizes the analog signals according to a threshold voltage set in advance, and outputs the binarized signals to an encoder circuit 24. In this embodiment, the threshold voltage is set in advance such that each of the output signals of the comparator 23 has a high/low ratio of 50:50 when the stepping motor 10 rotates at a constant rotation speed without rotational unevenness. Hereinafter, the output signals of the first and second photointerrupters (ch0 photointerrupter and ch1 photointerrupter) 21, 22 after being binarized will be referred to as the ENC0 and ENC1 signals, respectively.

The encoder circuit 24 acquires four type signal output timings. More specifically, the encoder circuit 24 acquires timings of change of the ENC0 signal from low to high and from high to low, and acquires timings of change of the ENC1 signal from low to high and from high to low.

A CPU 25 can make interrupt processing at any of the four type signal output timings acquired by the encoder circuit 24. At that time, the CPU 25 determines the type of the signal output timing at which the interruption has occurred. The CPU 25 has a function of executing programs stored in advance in a storage unit (not shown). The CPU 25 can access the encoder circuit 24 and a PWM (pulse-width modulation) generator 28 via a bus 27.

A sine wave generator 26 for generating a sine wave signal has a data table (not shown) having data regions stored with PWM values respectively corresponding to data numbers from "0" to "511" by which one period of the sine wave signal is divided into 512 parts. The sine wave generator 26 sequentially outputs the PWM values to the PWM generator 28. The PWM generator 28 outputs PWM signals to the motor driver 29. The motor driver 29 amplifies the PWM signals and supplies the amplified PWM signals to the A- and B-phase coils 11a, 11b of the stepping motor 10.

The first and second photointerrupters 21, 22, the slit rotary plate 16, the comparator 23, and the encoder circuit 24 of this embodiment correspond to a signal output unit of this invention. For each of the photointerrupters 21, 22, a photointerrupter is used that has a resolution with which an output signal thereof can properly be binarized by the comparator 23 but which is lower than a resolution of the sine wave generator 26.

In the following, a description will be given in detail of how drive signals are supplied from the sine wave generator 26 to the stepping motor 10 with reference to FIGS. 4 and 5.

Figure 4A:
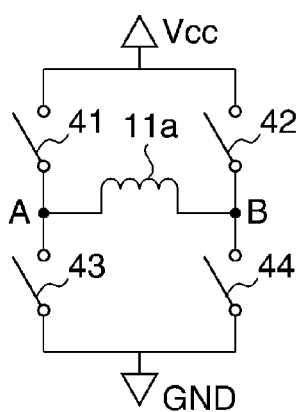
FIGS. 4A, 4B, 4C, 4D, 4E, 4F, 4G, 4H, and 4I are views showing operation of a motor driver to control a voltage applied to an A-phase stator coil of the stepping motor and control a current flowing through the coil.
Figure 4B:
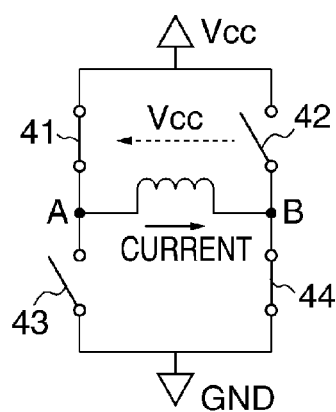
Figure 4C:
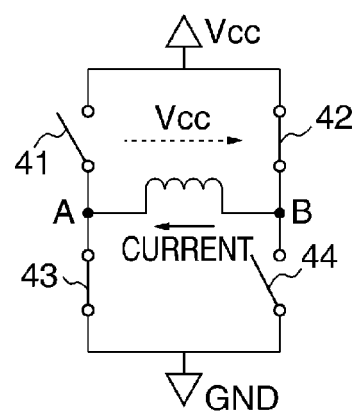

FIGS. 4A-4I illustrate operation of the motor driver 29 to control a voltage applied to the A-phase coil 11a and control a current flowing through the A-phase coil 11a. As previously described, the motor driver 29 amplifies PWM signals supplied from the PWM generator 28 and supplies the amplified PWM signals to the A- and B-phase coils 11a, 11b. As shown in FIGS. 4A-4C, one end A of the A-phase coil 11a is connected to a line that connects switches 41, 43 together, and another end B of the A-phase coil 11a is connected to a line that connects switches 42, 44 together.

Figure 4D:
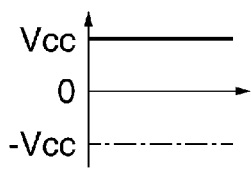
Figure 4F:
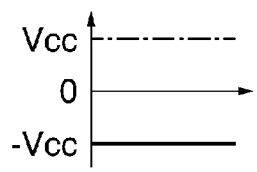

When the A-phase PWM signal supplied from the PWM generator 28 is at high level, the switches 41, 44 are closed as shown in FIG. 4B. In the state of FIG. 4B, a potential difference corresponding to the voltage of Vcc supplied to the motor driver 29 is produced between the ends A, B of the A-phase coil 11a. At that time, the electric potential at the end A of the A-phase coil 11a relative to that at the other end B thereof becomes +Vcc as shown in FIG. 4D, and a current of +I flows through the A-phase coil 11a as shown in FIG. 4E.

On the other hand, when the A-phase PWM signal supplied from the PWM generator 28 is at low level, the switches 42, 43 are closed as shown in FIG. 4C. In the state of FIG. 4C, a potential difference corresponding to the voltage of Vcc supplied to the motor driver 29 is produced between the ends A, B of the A-phase coil 11a. At that time, the electric potential at the end A of the A-phase coil 11a relative to that at the other end B thereof becomes −Vcc as shown in FIG. 4F, and a current of −I flows through the A-phase coil 11a as shown in FIG. 4G.

Figure 4H:
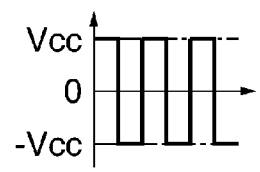
Figure 4E:
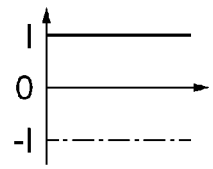
Figure 4G:
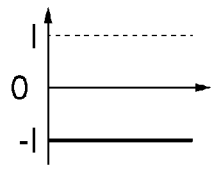

When an A-phase PWM signal that repeatedly alternately changes between high and low levels at short intervals is supplied, the potential at one end A of the A-phase coil 11a relative to that at another end B alternately changes between +Vcc and −Vcc, so that a voltage signal of rectangular shape is applied across the both ends of the A-phase coil 11a, as shown in FIG. 4H. The rectangular shaped voltage signal is smoothed by the A-phase coil 11a, and a current corresponding to the smoothed voltage signal flows through the coil 11a.

Figure 4I:
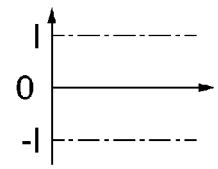

In other words, if a period of generation of the +Vcc voltage and that of the −Vcc voltage in one period of the rectangular shaped voltage signal applied to the A-phase coil 11a are the same as each other as shown in FIG. 4H, the current flowing through the A-phase coil 11a becomes effectively equal to zero as shown in FIG. 4I. Thus, if a duty ratio of the PWM signal (i.e., a ratio of the high-level PWM signal to the entire PWM signal) is 50% as in the case of FIG. 4H, it can be regarded that a voltage of zero volts is always applied to the A-phase coil 11a. It can be regarded that the +Vcc voltage is always applied to the A-phase coil 11a, if the duty ratio of the PWM signal is 100%, and that a +Vcc/2 is always applied to the A-phase coil 11a, if the duty ratio of the PWM signal is 75%.

Figure 5:
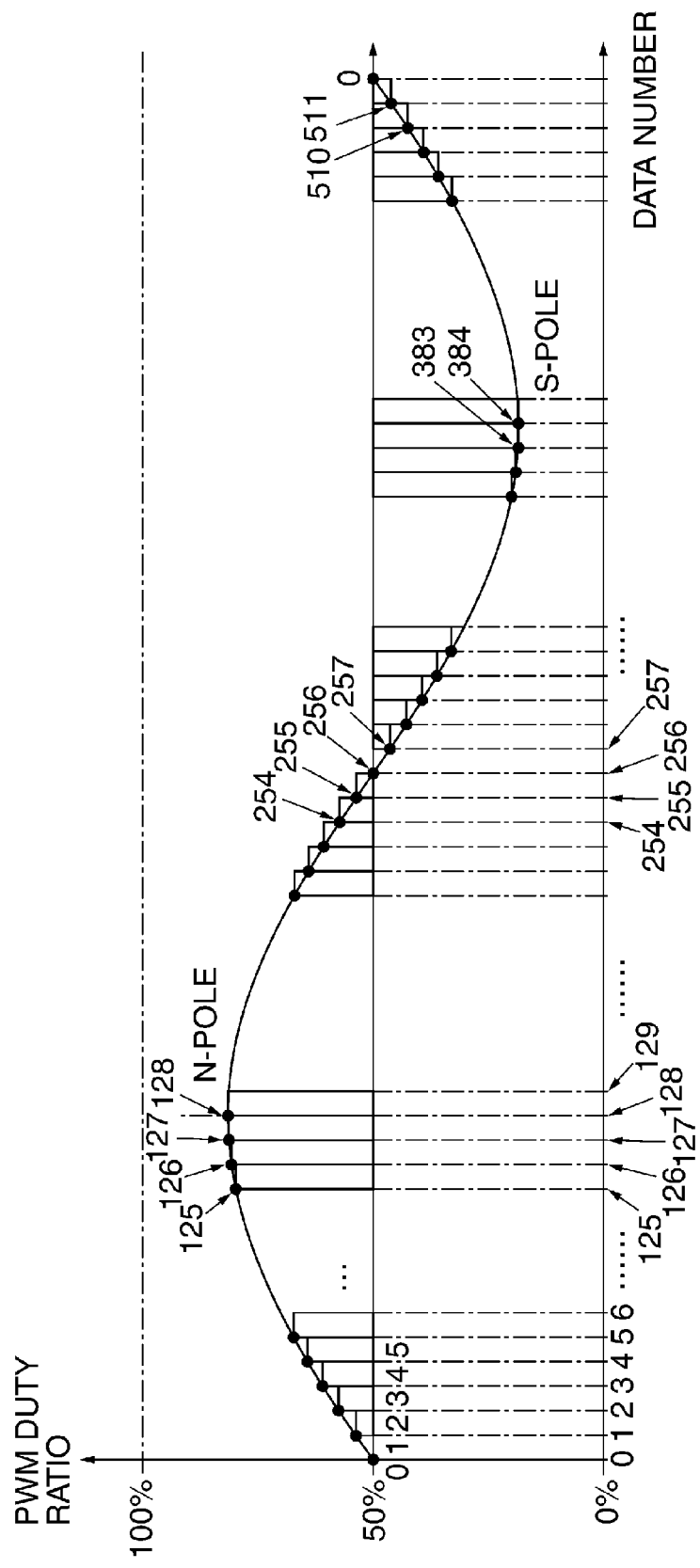
FIG. 5 is a view showing a relation between a phase of a sinusoidal voltage applied to one of stator coils and a data number representing a data region of a data table stored in a sine wave generator.

FIG. 5 shows a relation between a phase of a sinusoidal voltage applied to one of the stator coils and a data number representing a data region of the data table stored in the sine wave generator 26.

The sine wave generator 26 has the data table (not shown) described above. The data table has e.g. 512 data regions respectively stored with duty ratio values (%) of the PWM signal. In FIG. 5, numeric values 0-511 are data numbers that respectively represent zero-th to 511th data regions in the data table. In each data region, a duty ratio value of the PWM signal corresponding to a sinusoidal voltage phase is stored.

As shown in FIG. 5, the zero-th data region corresponds to a 0-degree phase of the sinusoidal voltage, and the 256th data region corresponds to a 180-degree phase of the sinusoidal voltage. The zero-th and 256th data regions are each stored with a duty ratio value of 50%.

In this embodiment, a duty ratio smaller than 100% is stored in the 128th data region corresponding to a peak of N-pole excitation, and a duty ratio larger than 0% is stored in the 384th data region corresponding to a peak of S-pole excitation, thereby preventing such an inconvenience, which is caused when a duty ratio of 100% is stored in the 128th data region corresponding to a peak of N-pole excitation, that a voltage of +Vcc is output based on the duty ratio of 100% to make a gain of the sinusoidal voltage unchangeable.

Sinusoidal voltage signals can be applied to the A- and B-phase coils 11a, 11b as described above referring to FIGS. 4 and 5, whereby the stepping motor 10 can be micro-step driven. In the following description, it is assumed that sinusoidal voltage signals are applied to the A- and B-phase coils 11a, 11b.

The sine wave generator 26, the PWM generator 28, and the motor driver 29 of this embodiment correspond to a drive unit of this invention, and the sinusoidal voltage signals applied to the A- and B-phase coils 11a, 11b correspond to drive signals of this invention that periodically change.

In this embodiment, since one period of the sine wave signal generated by the sine wave generator 26 is divided into 512 parts as already described, a state of each of the sinusoidal voltage signals applied to the A- and B-phase coils 11a, 11b changes 512 times during one revolution of the stepping motor 10. The comparator 23 binarizes the output signals of the photointerrupters 21, 22 into the ENC0 and ENC1 signals, respectively, as previously described. The number of times the comparator 23 outputs each of the ENC0 and ENC1 signals during one revolution of the stepping motor 10 is less than the number of times the state of each of the voltage signals applied to the coil 11a, 11b changes during one revolution of the stepping motor 10.

Referring to FIG. 2 again, the A-phase coil 11a, when applied with the sinusoidal voltage signal, excites the A-phase positive side and negative side stator poles 12a, 13a. Similarly, the B-phase coil 11b when applied with the sinusoidal voltage signal excites the B-phase positive side and negative side stator poles 12b, 13b. The voltage signals respectively applied to the A- and B-phase coils 11a, 11b are different in phase from each other.

With reference to FIGS. 3 and 6, a description will be given of a relation among the sinusoidal voltage signals applied to the A- and B-phase coils 11a, 11b, excited stator poles, and rotation positions of the rotor 14 and the slit rotary plate 16.

FIG. 3A shows the construction of the stepping motor 10. The rotor 14 of the stepping motor 10 is disposed to be freely movable. Around the rotor 14, the stator poles (i.e., A-phase positive side stator poles 12a, A-phase negative side stator poles 13a, B-phase positive side stator poles 12b, and B-phase negative side stator poles 13b) are disposed at intervals of a physical angle of 18 degrees.

When the voltage signal applied to the A-phase coil 11a is in a positive region of the sinusoidal waveform, the A-phase positive side stator poles 12a are each excited to N-pole and the A-phase negative side stator poles 13a are each excited to S-pole. When the voltage signal applied to the A-phase coil 11a is in a negative region of the sinusoidal waveform, the A-phase positive side stator poles 12a are each excited to S-pole and the A-phase negative side stator poles 13a are each excited to N-pole.

When the voltage signal applied to the B-phase coil 11b is in a positive region of the sinusoidal waveform, the B-phase positive side stator poles 12b are each excited to N-pole and the B-phase negative side stator poles 13b are each excited to S-pole. When the voltage signal applied to the B-phase coil 11b is in a negative region of the sinusoidal waveform, the B-phase positive side stator poles 12b are each excited to S-pole and the B-phase negative side stator poles 13b are each excited to N-pole.

Figures 6A, 6B:
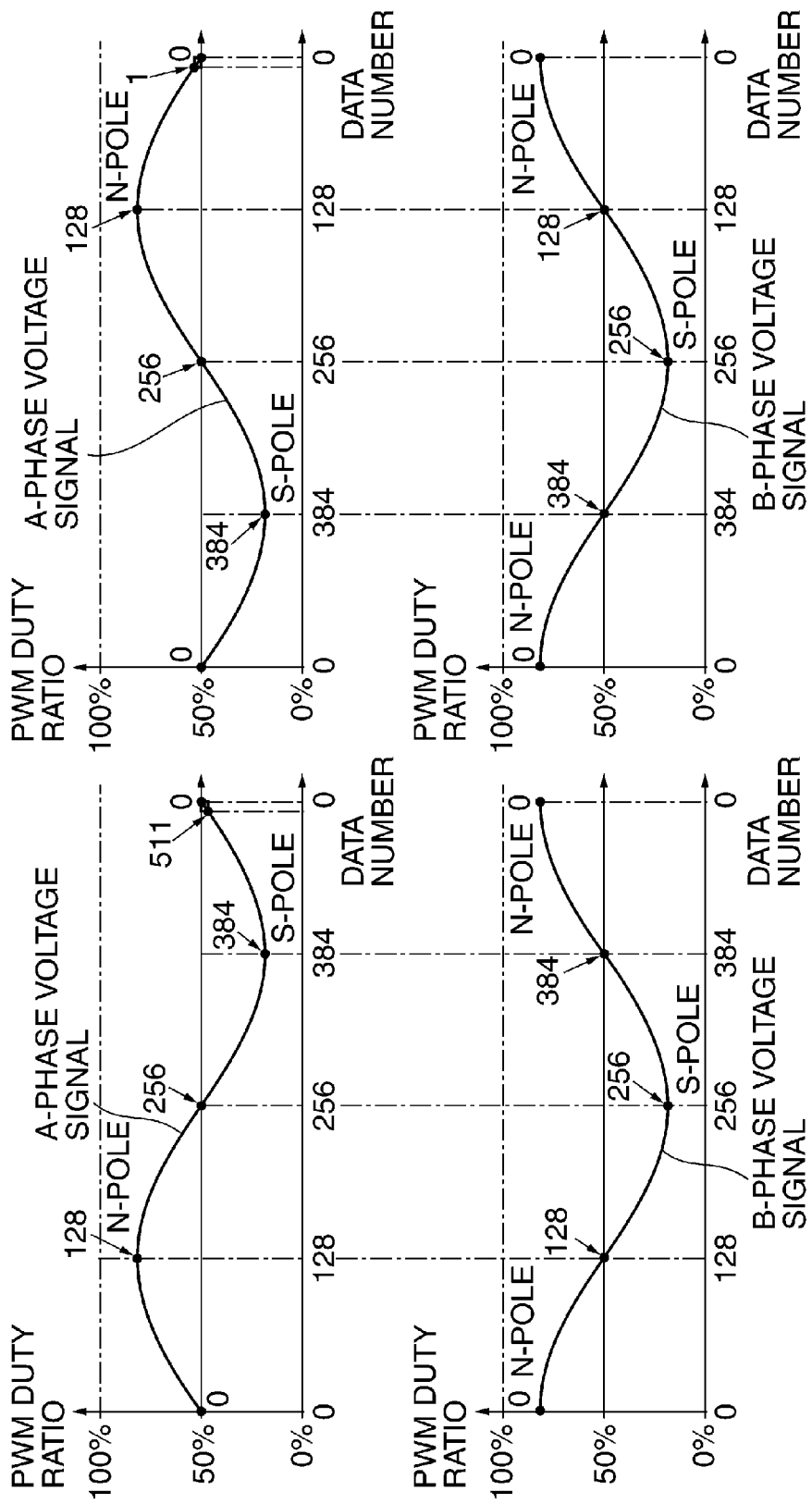
FIG. 6A is a view showing voltage signals applied to the stator coils to forwardly rotate the rotor.
FIG. 6B is a view showing voltage signals applied to the stator coils to reversely rotate the rotor.

FIG. 6A shows sinusoidal voltage signals respectively applied to the A- and B-phase coils 11a, 11b to forwardly rotate the rotor 14, and FIG. 6B shows sinusoidal voltage signals applied to the coils 11a, 11b to reversely rotate the rotor 14.

In FIGS. 6A and 6B, the terms "N-pole" and "S-pole" recited in the positive and negative regions of the sinusoidal waveform respectively indicate polarities to which the A- and B-phase positive side stator poles 12a, 12b are excited. The A-phase negative side stator pole 13a is excited to the polarity opposite to that of the A-phase positive side stator pole 12a, and the B-phase negative side stator pole 13b is excited to the polarity opposite to that of the B-phase positive side stator pole 12b.

To forwardly rotate the rotor 14, the sine wave generator 26 generates the drive signals while increasing the data number, and outputs the generated drive signals to the stepping motor 10. The drive signal output to the A-phase coil 11a becomes a sine wave, and the drive signal output to the B-phase coil 11b becomes a cosine wave and leads by 90 degrees the drive signal output to the A-phase coil 11a.

To reversely rotate the rotor 14, the sine wave generator 26 generates the drive signals while decreasing the data number, and outputs the drive signals to the stepping motor 10. The drive signal output to the B-phase coil 11b lags behind the drive signal output to the A-phase coil 11a by 90 degrees.

FIGS. 3B and 3C each show a relation among physical positions of the rotor 14, the first and second photointerrupters 21, 22, the slit rotary plate 16, the A-phase positive side stator pole 12a, and the B-phase positive side stator pole 12b. It should be noted that although the stepping motor 10 of this embodiment has twenty stator poles as shown in FIG. 3A, only one of the A-phase positive side stator poles 12a and one of the B-phase positive side stator poles 12b are shown in FIG. 3B and in FIG. 3C.

FIG. 3B shows a state where the rotor 14 and the slit rotary plate 16 are in a reference positional relation where N-pole regions of the rotor 14 and bright regions of the slit rotary plate 16 are coincident with one another.

FIG. 3C shows a state where the slit rotary plate 16 is attached to the rotor 14 at a position where the slit rotary plate 16 is deviated by an electrical angle of α (=180 degrees) in the reverse rotation direction from the reference positional relation shown in FIG. 3B. The electrical angle rotates 360 degrees during one cycle of the drive signal applied to the corresponding coil. In this embodiment, the rotation angle of 72 degrees of the rotor 14 corresponds to the electrical angle of 360 degrees of the drive signal.

As shown in FIG. 3A, the B-phase positive side stator pole 12b is disposed at a position away from the A-phase positive side stator pole 12a by a physical angle of 18 degrees in the reverse rotation direction. In this embodiment, the first photointerrupter 21 is disposed at the same rotation position as the B-phase positive side stator pole 12b, and the second photointerrupter 22 is disposed at the same rotation position as the A-phase positive side stator pole 12a. Thus, with rotation of the slit rotary plate 16 that rotates together with the rotor 14, the first and second photointerrupters 21, 22 output signals corresponding to the rotation phase of the rotor 14. In other words, the signal output from each photointerrupter changes with rotation of the rotor 14.

Figure 7A:
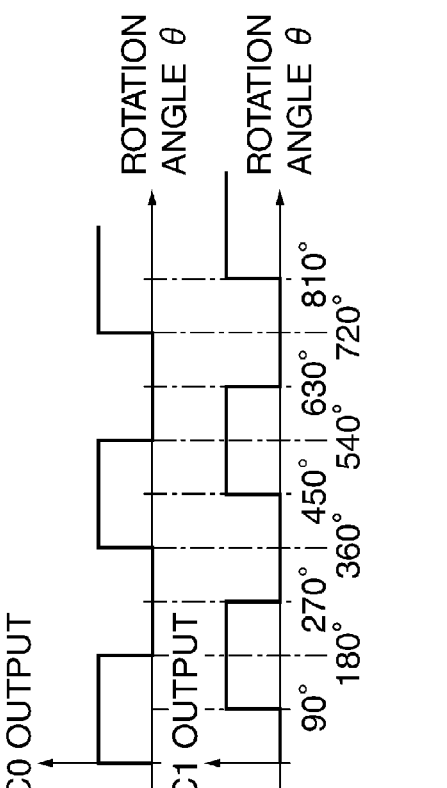
FIG. 7A is a view showing a modeled rotor having one N-pole and one S-pole and showing a state where the rotor and the slit rotary plate are in a reference positional relation.

FIG. 7A shows a modeled rotor having one N-pole and one S-pole, which is obtained by simplifying the rotor 14 that has five N-poles and five S-poles as shown in, e.g., FIG. 3B. In this model, the electrical angle of the drive signal is equal to the rotation angle of the rotor 14. The following description is given based on this model.

Figure 7B:
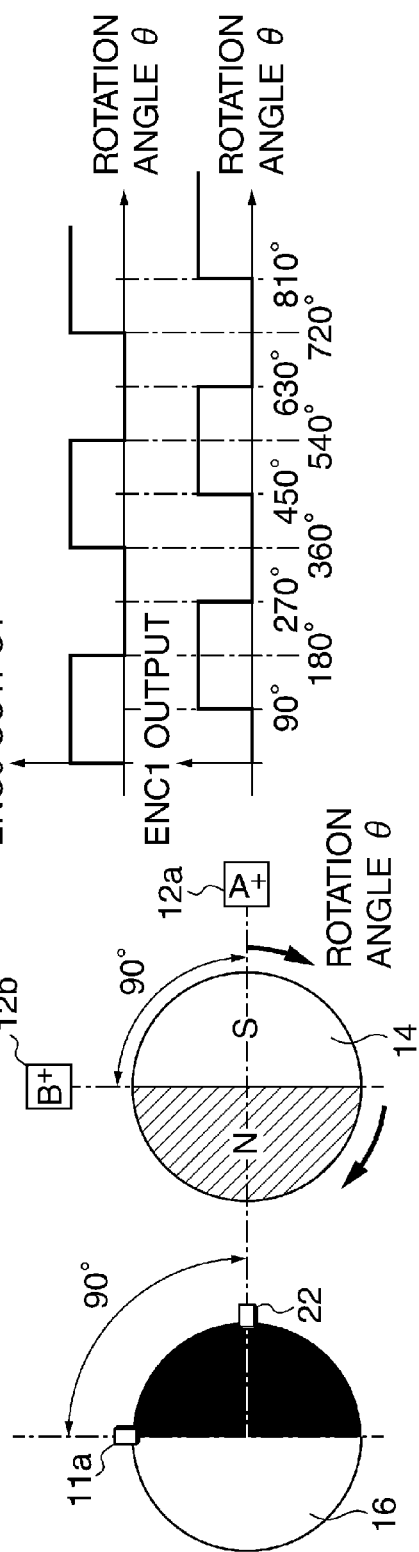
FIG. 7B is a graph showing a change of each of signals obtained by binarizing outputs of the first and second photointerrupters with a forward rotation of the rotor from the state of FIG. 7A.

FIG. 7A shows a state where the rotation phase of the rotor 14 and the bright/dark phase of the slit rotary plate 16 are in a reference positional relation. FIG. 7B shows a change of each of the ENC0 and ENC1 signals with forward rotation of the rotor 14 from the state of FIG. 7A, i.e., with increase of rotation angle θ. As already described, the ENC0 and ENC1 signals are obtained by binarizing the outputs from the ch0 and ch1 photointerrupters (first and second photointerrupters) 21, 22.

Figure 7C:
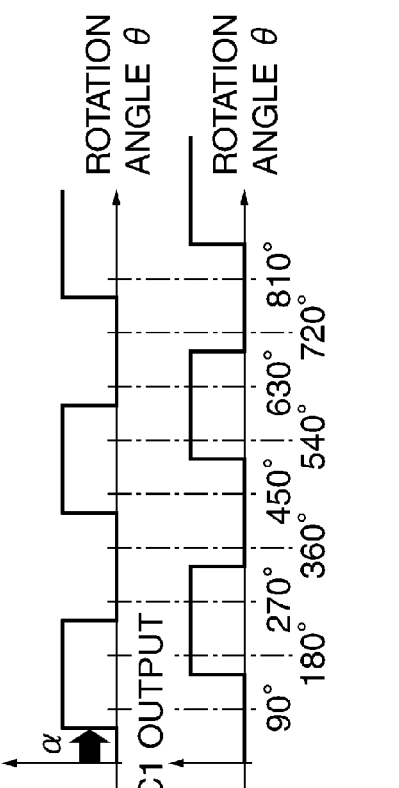
FIG. 7C is a view showing a state where the slit rotary plate is deviated from the reference positional relation of FIG. 7A in a reverse rotation direction.
Figure 7D:
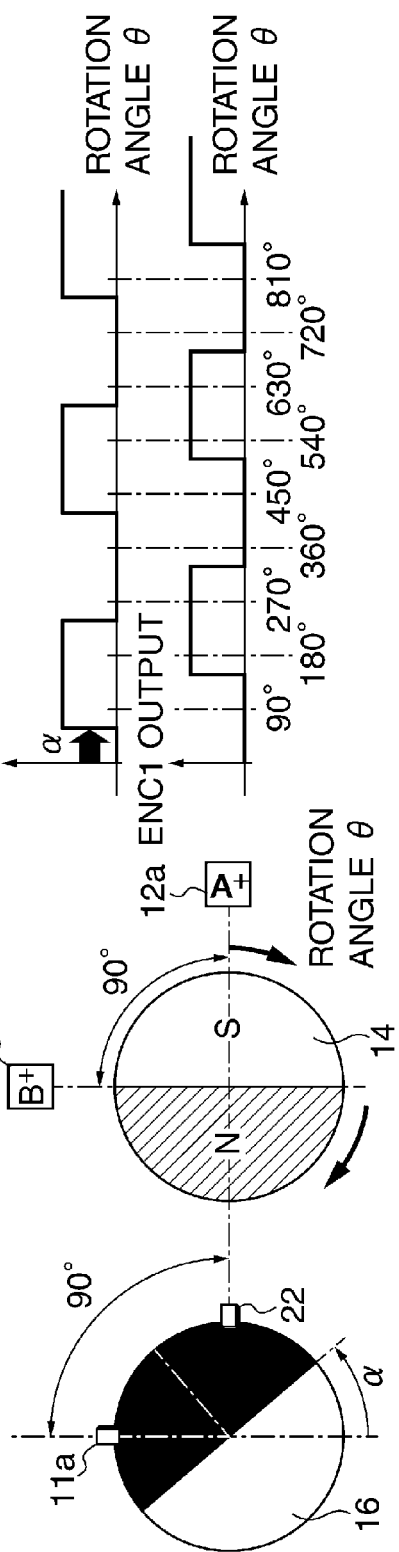
FIG. 7D is a view showing a change of each of binarized signals with a forward rotation of the rotor from the state of FIG. 7C.

FIG. 7C shows a state where the slit rotary plate 16 is deviated from the reference positional relation shown in FIG. 7A by an electrical angle of α degrees in the reverse rotation direction. FIG. 7D shows a change of each of the ENC0 and ENC1 signals with forward rotation of the rotor 14 from the state of FIG. 7C.

In a case where the slit rotation plate 16 is mounted to the rotor shaft 15 as shown in FIG. 7C so as to be deviated from the reference positional relation of FIG. 7A, the ENC0 and ENC1 signals are output with a delay of a degrees in electrical angle when the rotor 14 rotates forwardly and are output with an advance of α degrees in electrical angle when the rotor 14 rotates reversely, as compared to the case where the slit rotation plate 16 is mounted to the rotor shaft 15 in the reference positional relation of FIG. 7A. It should be noted that the mounting deviation angle α of the slit rotation plate 16 is set and specified at the time of fabrication of the motor drive apparatus 100.

FIG. 8A shows a relation between the electrical angle and rotation position of the rotor 14 at rotor electrical angles of 0, 90, 180, and 270 degrees in the case without follow-up delay in rotation of the rotor 14 relative to sinusoidal voltage signals applied to the A- and B-phase coils 11a, 11b to forwardly rotate the rotor 14.

FIG. 8B shows a relation between the electrical angle and rotation position of the rotor 14 at rotor electrical angles of 0, 90, 180, and 270 degrees in the case of the presence of follow-up delay in rotation of the rotor 14 (hereinafter, referred to as the follow-up delay of the rotor 14) relative to the sinusoidal voltage signals when the rotor 14 is forwardly rotated.

Polarities to which the A- and B-phase positive side stator poles 12a, 12b are excited are the same between the cases of FIGS. 8A and 8B, except that in the case of FIG. 8B, there is a follow-up delay (denoted by reference numeral 81) of the rotor 14 relative to the sinusoidal voltage signals.

At the rotor electrical angle of 0 degrees, the A-phase positive side stator pole 12a is excited to S-pole, but the B-phase positive side stator pole 12b is excited neither to N-pole nor to S-pole. At the rotor electrical angle of 90 degrees, the A-phase positive side stator pole 12a is excited neither to N-pole nor to S-pole, but the B-phase positive side stator pole 12b is excited to N-pole. At the rotor electrical angle of 180 degrees, the A-phase positive side stator pole 12a is excited to N-pole, but the B-phase positive side stator pole 12b is excited neither to N-pole nor to S-pole. At the rotor electrical angle of 270 degrees, the A-phase positive side stator pole 12a is excited neither to N-pole nor to S-pole, but the B-phase positive side stator pole 12b is excited to S-pole.

Figure 9:
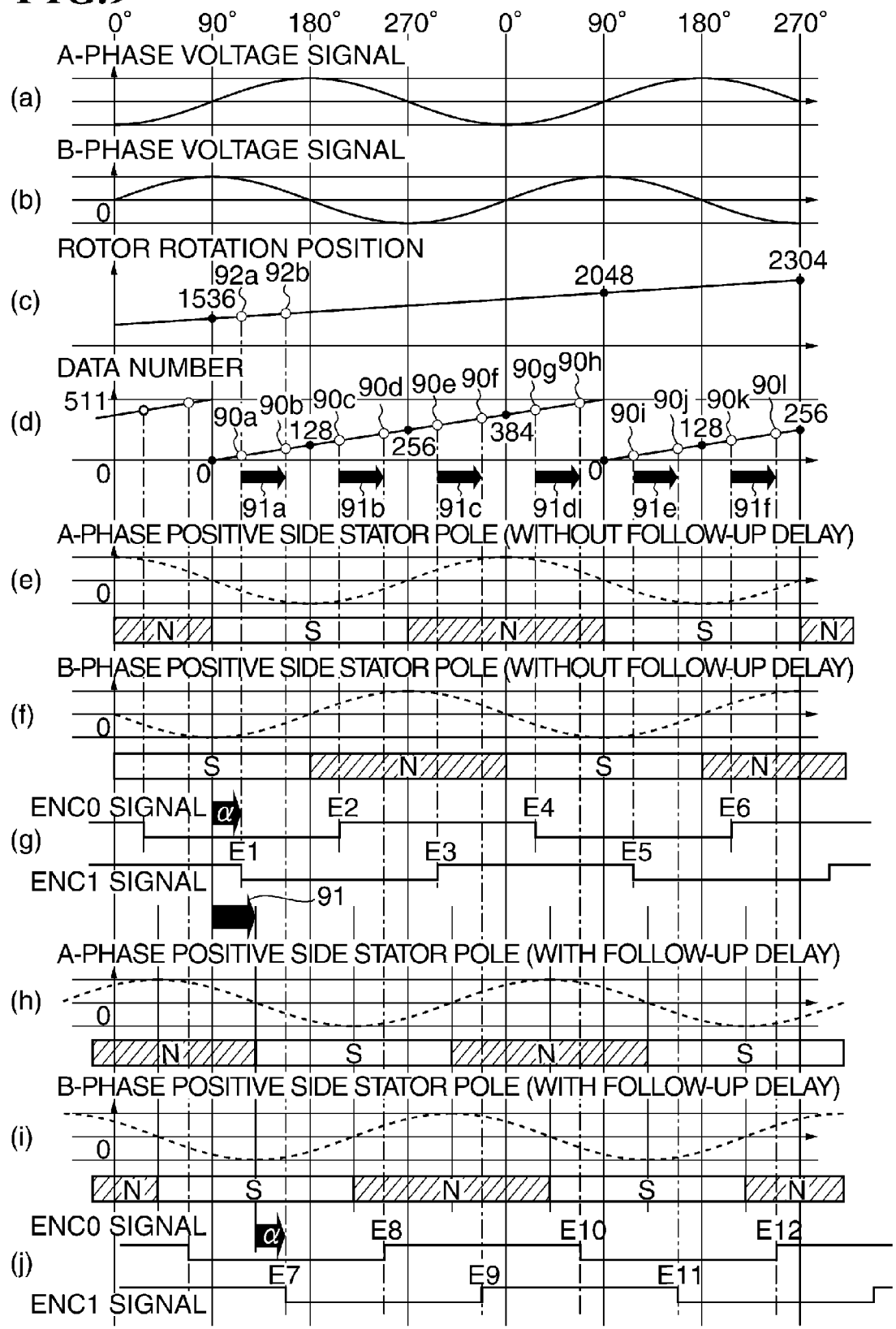
FIG. 9 is a view showing a relation among voltage signals applied to the stator coils to forwardly rotate the rotor 14, rotor rotation position, and outputs of the first and second photointerrupters.

FIG. 9 shows a relation among voltage signals applied to the A- and B-phase coils 11a, 11b to forwardly rotate the rotor 14, rotation position of the rotor 14, and outputs of the first and second photointerrupters 21, 22.

In (a) of FIG. 9, there is shown the sinusoidal voltage signal applied to the A-phase coil 11a. When this sinusoidal voltage signal is in a positive region, each of the A-phase positive side stator poles 12a is excited to N-pole. When the sinusoidal voltage signal is in a negative region, the A-phase positive side stator pole 12a is excited to S-pole.

In (b) of FIG. 9, there is shown the sinusoidal voltage signal applied to the B-phase coil 11b. When this sinusoidal voltage signal is in a positive region, each of the B-phase positive side stator poles 12b is excited to N-pole. When the sinusoidal voltage signal is in a negative region, the B-phase positive side stator pole 12 is excited to S-pole.

In FIG. 9, there is shown a relation similar to the relation shown in FIG. 8A or 8B between rotor electrical angle and rotor rotational position. In other words, when the sinusoidal voltage signals shown in (a) and (b) of FIG. 9 are applied respectively to the A- and B-phase coils 11a and 11b, the rotor 14 rotates as shown in FIG. 8A or 8B.

In (d) of FIG. 9, there is shown a change of the data number corresponding to the PWM value. The data number is output from the sine wave generator 26 to apply the sinusoidal voltage signal to the A-phase coil 11a. During one period of the sinusoidal voltage signal, the data number output from the sine wave generator 26 sequentially changes from 0 to 511. By detecting the data number output from the sine wave generator 26, a phase (state) of the voltage signal applied to the A-phase coil 11a can be detected. Since it is known that there is a phase difference of 90 degrees between the voltage signals applied to the A- and B-phase coils 11a and 11b, a phase (state) of the voltage signal applied to the B-phase coil 11b can also be detected by detecting the data number output from the sine wave generator 26.

In (c) of FIG. 9, there is shown a change of current rotation position of the rotor 14. A current rotation position is represented by an accumulated number of times of output of the data number from the sine wave generator 26. The accumulated number of times of output increases with a forward rotation of the rotor 14, but decreases with a reverse rotation of the rotor 14. For example, the accumulated number of times of output increases by 512 per one forward revolution of the rotor 14, and decreases by 512 per one reverse revolution of the rotor 14. In a case that the accumulated number of times of output becomes equal to a value of 1408 when the rotor electrical angle becomes 0 degrees for the first time, the accumulated number of times of output becomes equal to a value of 1920 when the rotor 14 has rotated by one revolution and the rotor electrical angle becomes 0 degrees again.

In (e) and (f) of FIG. 9, there are shown relations between rotation position of the rotor 14 and excited states of the A- and B-phase positive side stator poles 12a, 12b in the case without follow-up delay of the rotor 14 relative to voltage signals applied to the A- and B-phase coils 11a and 11b as in the case of FIG. 8A.

In (e) of FIG. 9, a dotted waveform represents an excited polarity of the A-phase positive side stator pole 12a. More specifically, this dotted waveform indicates that the A-phase positive side stator pole 12*a* is excited to N-pole when the sinusoidal voltage signal applied to the A-phase coil 11*a* is in a positive region and excited to S-pole when the sinusoidal voltage signal is in a negative region as previously described.

In (e) of FIG. 9, beneath the dotted waveform, the rotor 14 is shown in development form. In FIG. 9, there is a relation similar to the relation shown in FIG. 8A between rotor electrical angle and rotor rotational position as previously described. More specifically, at the rotor electrical angle of 0 degrees, a circumferential center of the N-pole of the rotor 14 faces the A-phase positive side stator pole 12*a*. At the rotor electrical angle of 180 degrees, a circumferential center of the S-pole of the rotor 14 faces the stator pole 12*a*. Thus, the dotted waveform has a maximum amplitude at rotor electrical angles of 0 degrees and 180 degrees.

In (f) of FIG. 9, a dotted waveform represents an excited polarity of the B-phase positive side stator pole 12*b*. More specifically, the dotted waveform indicates that the B-phase positive side stator pole 12*b* is excited to N-pole when the sinusoidal voltage signal applied to the B-phase coil 11*b* is in a positive region and excited to S-pole when the sinusoidal voltage signal is in a negative region as previously described.

In (f) of FIG. 9, beneath the dotted waveform, the rotor 14 is shown in development form. As in the case of FIG. 8A, at the rotor electrical angle of 90 degrees, a circumferential center of the S-pole of the rotor 14 faces the B-phase positive side stator pole 12*b*. At the rotor electrical angle of 270 degrees, a circumferential center of the N-pole of the rotor 14 faces the stator pole 12*b*. Thus, the dotted waveform has a maximum amplitude at rotor electrical angles of 90 degrees and 270 degrees.

In (g) of FIG. 9, there are shown outputs of the ch0 and ch1 photointerrupters 21, 22 in the case without follow-up delay of the rotor 14 relative to voltage signals applied to the A- and B-phase coils 11*a*, 11*b* as in the case of FIG. 8A. More specifically, there are shown ENC0 and ENC1 signals (respectively obtained by binarizing outputs of the ch0 and ch1 photointerrupters 21, 22) at respective rotor electrical angles. The ENC0 and ENC1 signals shown in (g) of FIG. 9 reflect the mounting deviation angle α of the slit rotation plate 16 shown in FIG. 7C and change between high and low levels with a delay of α degrees in electrical angle.

In (h) and (i) of FIG. 9, there are shown relations between rotation position of the rotor 14 and excited states of the A- and B-phase positive side stator poles 12*a*, 12*b* in a case that there is a follow-up delay of the rotor 14 relative to voltage signals applied to the A- and B-phase coils 11*a*, 11*b* as in the case of FIG. 8B.

In (f) of FIG. 9, a dotted waveform represents an excited polarity of the A-phase positive side stator pole 12*a*. This dotted waveform lags behind the dotted waveform shown in (e) of FIG. 9 by an amount of follow-up delay 91 that corresponds to the follow-up delay 81 of the rotor 14.

In (h) of FIG. 9, beneath the dotted waveform, the rotor 14 is shown in development form. As in the case of FIG. 8B, at a rotor electrical angle between 0 degrees to 90 degrees, a circumferential center of the N-pole of the rotor 14 faces the A-phase positive side stator pole 12*a*. At a rotor electrical angle between 180 degrees to 270 degrees, a circumferential center of the S-pole of the rotor 14 faces the stator pole 12*a*. Thus, the dotted waveform has a maximum amplitude at the rotor electrical angles between 0 degrees to 90 degrees and between 180 degrees to 270 degrees.

In (i) of FIG. 9, a dotted waveform represents an excited polarity of the B-phase positive side stator pole 12*b*. This dotted waveform lags behind the dotted waveform shown in (f) of FIG. 9 by an amount of follow-up delay 91.

In (i) of FIG. 9, beneath the dotted waveform, the rotor 14 is shown in development form. As in the case of FIG. 8B, at a rotor electrical angle between 270 degrees to 0 degrees, a circumferential center of the N-pole of the rotor 14 faces the B-phase positive side stator pole 12*b*. At a rotor electrical angle between 90 degrees to 180 degrees, a circumferential center of the S-pole of the rotor 14 faces the stator pole 12*b*. Thus, the dotted waveform has a maximum amplitude at the rotor electrical angles between 270 degrees to 0 degrees and between 90 degrees to 180 degrees.

In (j) of FIG. 9, there are shown ENC0 and ENC1 signals corresponding to outputs of the ch0 and ch1 photointerrupters 21, 22 observed when there is a follow-up delay of the rotor 14 relative to voltage signals applied to the A- and B-phase coils 11*a*, 11*b* as in the case of FIG. 8B. The ENC0 and ENC1 signals change between high and low levels with the amount of follow-up delay 91 (corresponding to the follow-up delay 81 shown in FIG. 8B) relative to the high/low changes of the ENC0 and ENC1 signals shown in (g) of FIG. 9.

FIG. 10A shows a relation between the electrical angle and rotation position of the rotor 14 at rotor electrical angles of 0, 90, 180, and 270 degrees in the case without follow-up delay of the rotor 14 relative to the sinusoidal voltage signals applied to the A- and B-phase coils 11*a*, 11*b* to reversely rotate the rotor 14.

FIG. 10B shows a relation between the electrical angle and rotation position of the rotor 14 at rotor electrical angles of 0, 90, 180, and 270 degrees in the case of the presence of follow-up delay of the rotor 14 relative to the sinusoidal voltage signals when the rotor 14 is reversely rotated. In FIG. 10B, reference numeral 101 denotes a follow-up delay of the rotor 14 relative to the sinusoidal voltage signals. With the construction shown in FIGS. 10A and 10B, the A- and B-phase coils 11*a*, 11*b* are excited in basically the same manner as in the case of FIGS. 8A and 8B at respective rotor electrical angles, and a description thereof will be omitted.

Figure 11:
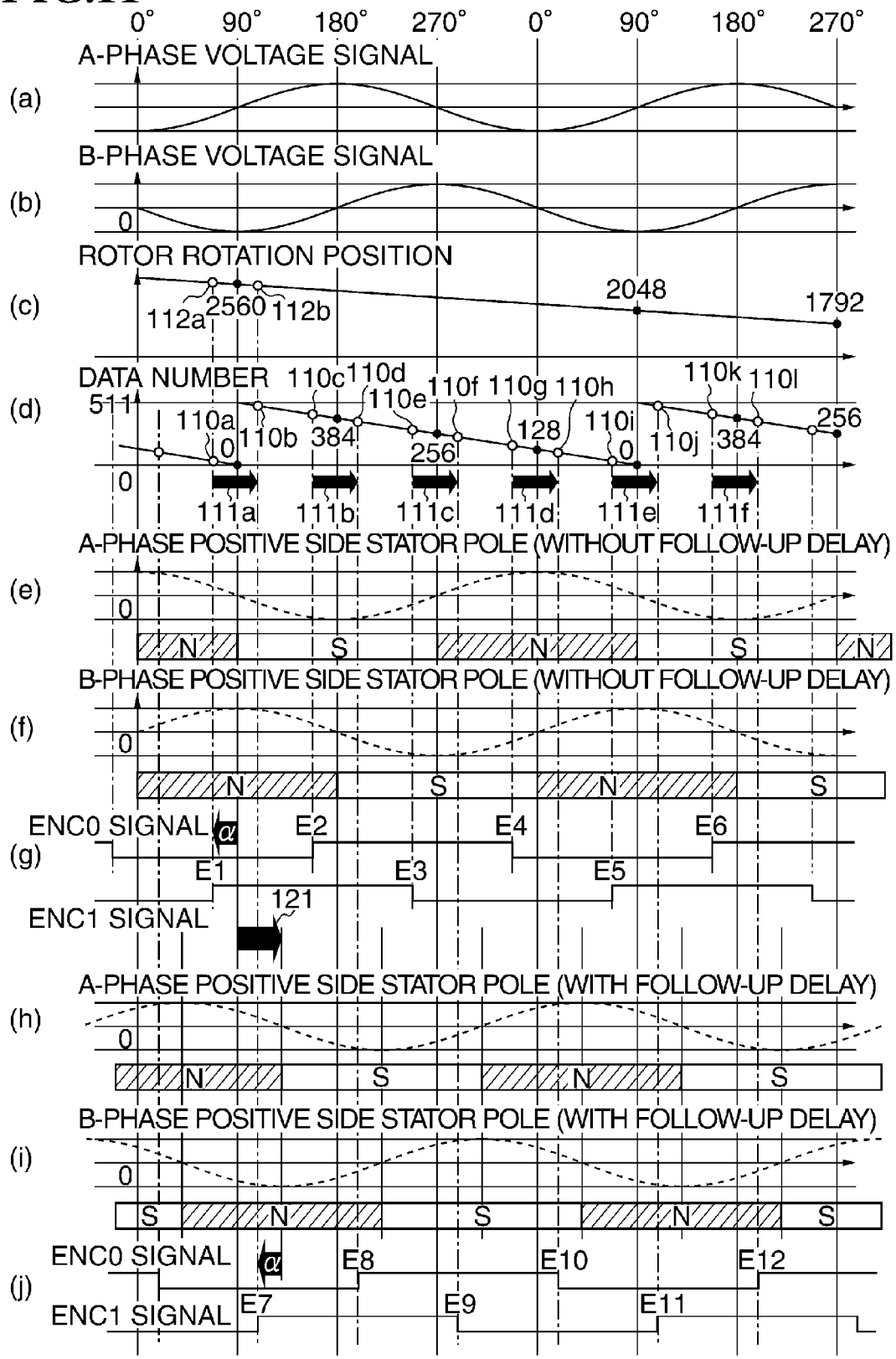
FIG. 11 is a view showing a relation among voltage signals applied to the stator coils to reversely rotate the rotor 14, rotor rotation position, and outputs of the first and second photointerrupters.

FIG. 11 shows a relation among voltage signals applied to the A- and B-phase coils 11*a*, 11*b* to reversely rotate the rotor 14, rotation position of the rotor 14, and outputs of the first and second photointerrupters 21, 22.

Various signals in (a)-(j) of FIG. 11 are basically the same as those shown in (a)-(j) of FIG. 9, and a description thereof will be omitted. In FIG. 11, reference numeral 121 denotes a follow-up delay of the rotor 14 relative to the sinusoidal voltage signals, which corresponds to the follow-up delay 101 shown in FIG. 10B.

The case where the rotor 14 is reversely rotated is different in the following points from the case where the rotor 14 is forwardly rotated. When the rotor 14 is reversely rotated, the data number output from the sine wave generator 26 decreases with rotor rotation, as shown in (d) of FIG. 11. The accumulated number of times of output of the data number from the sine wave generator 26 also decreases with a reverse rotation of the rotor 14. More specifically, the accumulated number of times of output decreases by 512 per one revolution of the rotor 14. In the case of reverse rotation of the rotor 14, due to the mounting deviation angle α of the slit rotation plate 16, timings at which the ENC0 and ENC1 signals change between high and low levels lead by α degrees in electrical angle.

Figure 12:
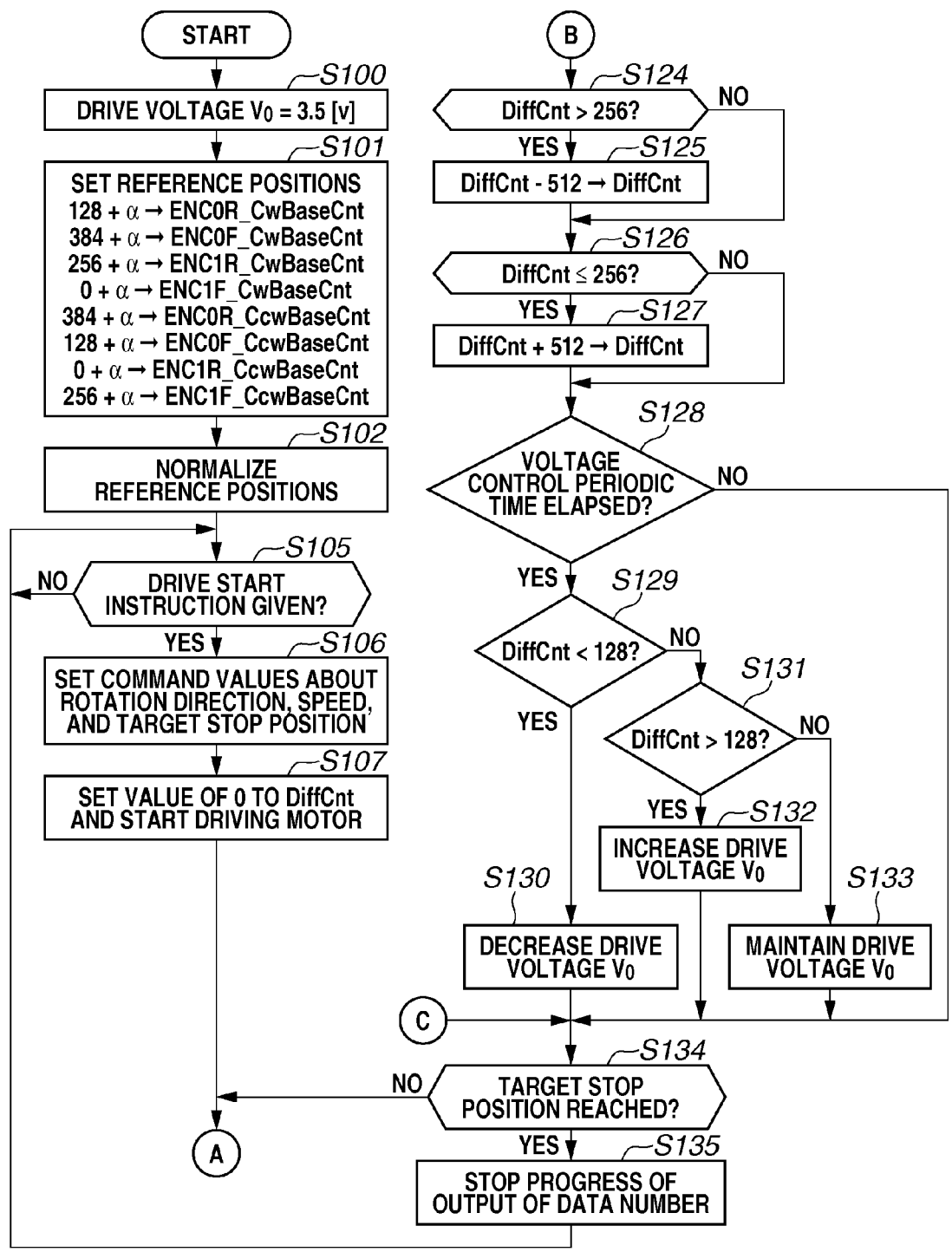
FIGS. 12 and 13 are a flowchart showing procedures of a stepping motor drive process.
Figure 13:
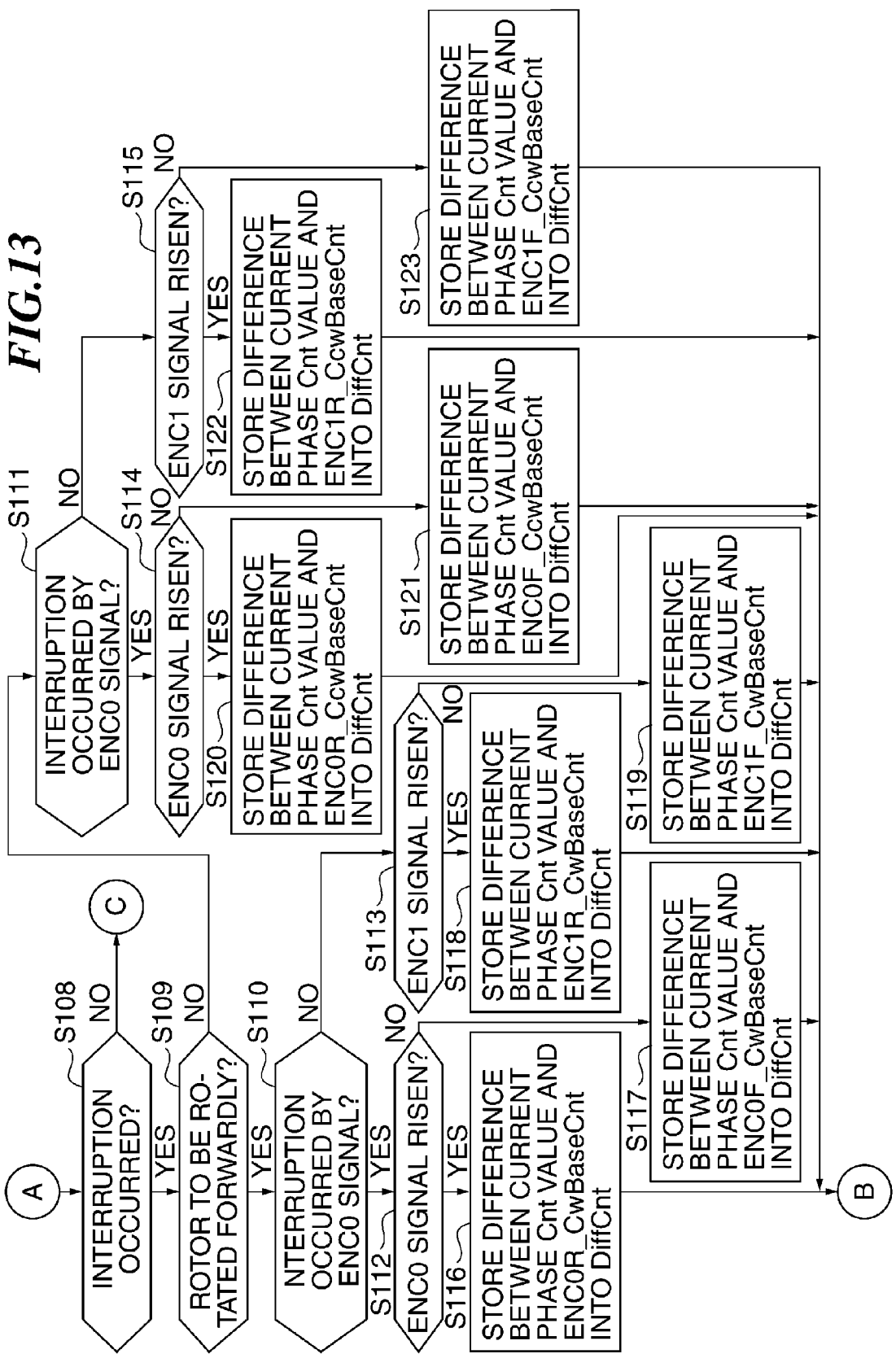

FIGS. 12 and 13 show in flowchart the procedures of a stepping motor drive process executed by the CPU 25 of the motor drive apparatus 100.

In step S100, the CPU 25 set a drive voltage $V_0$, which is applied by the motor driver 29 to the A-phase coil 11a and the B-phase coil 11b, to 3.5 v (voltage).

In step S101, the CPU 25 sets reference rotation positions (hereinafter, referred to as the reference positions) corresponding to timings at which there occur changes in outputs of the first and second photointerrupters (ch0 and ch1 photointerrupters) 21, 22. By way of example, the CPU 25 sets, as reference positions, data numbers corresponding to timings at which either the ENC0 signal or the ENC1 signal changes between high and low levels in the case without follow-up delay of the rotor 14.

First, a description will be given of how the reference positions are set in the case of forward rotation of the rotor 14.

As shown in (g) of FIG. 9, the ENC1 signal changes from high to low at timings of E1 and E5, the ENC0 signal changes from low to high at timings of E2 and E6, the ENC1 signal changes from low to high at a timing of E3, and the ENC0 signal changes from high to low at a timing of E4.

The CPU 25 adds a value α, which is obtained by converting the mounting deviation angle α of the slit rotation plate 16 into the number of times of output of data number, to a data number "0" to thereby calculate data numbers 90a and 90i which are the same as each other and will be referred to as the data number 90a, 90i (ditto in similar cases). The CPU 25 sets the data number 90a, 90i as a reference position corresponding to the timings E1 and E5. Further, the CPU 25 sets data number 90c, 90k obtained by adding the value α to a data number "128" as a reference position corresponding to timings E2 and E6, sets data number 90e obtained by adding the value α to a data number "256" as a reference position corresponding to the timing E3, and sets a data number 90g obtained by adding the value α to a data number "384" as a reference position corresponding to the timing E4.

The just-mentioned four reference positions are indicated by symbols ENC1F_CwBaseCnt, ENC0R_CwBaseCnt, ENC1R_CwBaseCnt, and ENC0F_CwBaseCnt within a block of step S101 of FIG. 12.

Next, a description will be given of how the reference positions are set in the case of reverse rotation of the rotor 14.

As shown in (g) of FIG. 11, the ENC1 signal changes from low to high at the timings of E1 and E5, the ENC0 signal changes from low to high at the timings of E2 and E6, the ENC1 signal changes from high to low at the timing of E3, and the ENC0 signal changes from high to low at the timing of E4.

The CPU 25 sets a data number 110a, 110i obtained by adding the value α to the data number "0" as a reference position corresponding to the timings E1 and E5, sets a data number 110c, 110k obtained by adding the value α to the data number "384" as a reference position corresponding to the timings E2 and E6, sets a data number 110e obtained by adding the value α to the data number "256" as a reference position corresponding to the timing E3, and sets a data number 110g obtained by adding the value α to the data number "128" as a reference position corresponding to the timing E4.

The just-mentioned four reference positions are indicated by symbols ENC1R_CcwBaseCnt, EnC0R_CcwBaseCnt, ENC1F_CcwBaseCnt, and ENC0R_CcwBaseCnt within the block of the step S101 in FIG. 12.

As described above, data numbers are calculated that correspond to timings at each of which the ENC0 or ENC1 signal changes between high and low levels when the rotor 14 is forwardly or reversely rotated. The calculated data numbers are stored into variable regions. The reference positions in the case without follow-up delay of the rotor 14 relative to voltage signals applied to the A- and B-phase coils 11a, 11b are set in step S101, as already described.

In step S102, the CPU 25 determines whether any of the eight data numbers set as the reference positions in step S101 exceeds a value of 512. If any of the eight data numbers exceeds the value of 512, the value of 512 is subtracted from such data number and the resultant data number is set as the reference position. Thus, the data numbers set as the reference positions are normalized between the value of 0 and the maximum value "511" of the data numbers.

In step S105, the CPU 25 determines whether a drive start instruction to the stepping motor 10 is given. If the drive start instruction is given (YES in step S105), the flow proceeds to step S106. If no drive start instruction is given (NO in step S105), the flow repeats processing in step S105.

In step S106, the CPU 25 sets command values about rotation direction, speed, and target stop position, which are sent together with the drive start instruction.

In step S107, the CPU 25 sets a value of "0" to a variable DiffCnt for storing a difference between one of the data numbers set as the reference positions in step S101 and a data number corresponding to a timing at which the ENC0 or ENC1 signal changes between high and low levels. Then, the CPU 25 starts to drive the stepping motor 10 in a condition according to the command values set in step S106.

In step S108, the CPU 25 determines whether or not an interruption has occurred by a high/low change of the ENC0 or ENC1 signal. If an interruption has occurred (YES in step S108), the CPU 25 proceeds the process to step S109. If no interruption has occurred (NO in step S108), the CPU 25 proceeds the process to step S130.

In step S109, the CPU 25 determines whether the rotor 14 should be rotated forwardly based on information about the rotation direction sent together with the drive start instruction. If the rotor 14 should be rotated forwardly (YES in step S109), the process proceeds to step S110. If the rotor 14 should be rotated reversely (NO in step S109), the process proceeds to step S111.

In step S110, the CPU 25 determines whether the interruption determined in step S108 has occurred by the ENC0 signal. If the interruption has occurred by the ENC0 signal (YES in step S110), the process proceeds to step S112.

In step S112, the CPU 25 determines whether the ENC0 signal has risen from low to high. If the ENC0 signal has risen from low to high (YES in step S112), the process proceeds to step S116.

In step S116, the CPU 25 acquires a data number 90d or 90l corresponding to the timing E8 or E12 at which the ENC0 signal has changed from low to high (see, (d) and (j) of FIG. 9), and stores, into the variable DiffCnt, a difference 91b or 91f (positive value) between the acquired data number 90d or 90l (current phase Cnt value) and the data number 90c or 90k set as the reference position ENC0R_CwBaseCnt in step S101.

The difference 91b or 91f corresponds to the amount of follow-up delay of the rotor 14 relative to the sinusoidal voltage signals applied to the A-phase coil 11a and the B-phase coil 11b.

Values stored in the variable DiffCnt are obtained by expressing, in data numbers, the amount of follow-up delay of the rotor 14 relative to the sinusoidal voltage signals applied to the A-phase coil 11a and the B-phase coil 11b.

If determined in step S112 that the ENC0 signal has not risen from low to high, i.e., if the ENC0 signal has fallen from high to low, the process proceeds to step S117.

In step S117, the CPU 25 acquires a data number 90h corresponding to a timing E10 at which the ENC0 signal has fallen from high to low (see, (d) and (j) of FIG. 9), and stores into the variable DiffCnt a difference 91d (positive value) between the acquired data number 90h (current phase Cnt value) and the data number 90g set as the reference position ENC0R_CwBaseCnt in step S101.

If determined in step S110 that the interruption has not occurred by the ENC0 signal, the process proceeds to step S113.

In step S113, the CPU 25 determines whether the ENC1 signal has risen from low to high. If the ENC1 signal has risen from low to high (YES in step S113), the process proceeds to step S118.

In step S118, the CPU 25 acquires a data number 90f corresponding to a timing E9 at which the ENC1 signal has risen from low to high (see, (d) and (j) of FIG. 9), and stores into the variable DiffCnt a difference 91c (positive value) between the acquired data number 90f (current phase Cnt value) and the data number 90e set as the reference position ENC1R_CwBaseCnt in step S101.

If determined in step S113 that the ENC1 signal has not risen from low to high, i.e., if the ENC1 signal has fallen from high to low, the process proceeds to step S119.

In step S119, the CPU 25 acquires a data number 90b or 90j corresponding to a timing E7 or E11 at which the ENC1 signal has fallen from high to low (see, (d) and (j) of FIG. 9), and stores into the variable DiffCnt a difference 91a or 91e (positive value) between the acquired data number 90b or 90j (current phase Cnt value) and the data number 90a or 90i set as the reference position ENC1F_CwBaseCnt in step S101.

If determined in step S109 that the rotor 14 should be rotated reversely, the process proceeds to step S111. In step S111, as in the case of step S110, the CPU 25 determines whether the interruption determined in step S108 has occurred by the ENC0 signal. If the answer to step S111 is YES, the process proceeds to step S114. Otherwise, the process proceeds to step S115.

In step S114, as in the case of step S112, the CPU 25 determines whether the ENC0 signal has risen from low to high. If the answer to step S114 is YES, the process proceeds to step S120. Otherwise, the process proceeds to step S121.

In step S115, as in the case of step S113, the CPU 25 determines whether the ENC1 signal has risen from low to high. If the answer to step S115 is YES, the process proceeds to step S122. Otherwise, the process proceeds to step S123.

In step S120, the CPU 25 acquires a data number 110d or 110l corresponding to a timing E8 or E12 at which the ENC0 signal has risen from low to high (see, (d) and (j) of FIG. 11), and stores into the variable DiffCnt a difference 111b or 111f (negative value) between the acquired data number 110d or 110l (current phase Cnt value) and the data number 110c or 110k set as the reference position ENC0R_CcwBaseCnt in step S101.

In step S121, the CPU 25 acquires a data number 101h corresponding to a timing E10 at which the ENC0 signal has fallen from high to low (see, (d) and (j) of FIG. 11), and stores into the variable DiffCnt a difference 111d (negative value) between the acquired data number 101h (current phase Cnt value) and the data number 110g set as the reference position ENC0F_CcwBaseCnt in step S101.

In step S122, the CPU 25 acquires a data number 110f corresponding to the timing E9 at which the ENC1 signal has risen from low to high (see, (d) and (j) of FIG. 11), and stores into the variable DiffCnt a difference 111c (negative value) between the acquired data number 110f (current phase Cnt value) and the data number 110e set as the reference position ENC1R_CcwBaseCnt in step S101.

In step S123, the CPU 25 acquires a data number 110b or 110j corresponding to the timing E7 or E11 at which the ENC1 signal has fallen from high to low (see, (d) and (j) of FIG. 11), and stores into the variable DiffCnt a difference 111a or 111e (negative value) between the acquired data number 110b or 110j (current phase Cnt value) and the data number 110a or 110i set as the reference position ENC1F_CcwBaseCnt in step S101.

If two data numbers used for the difference calculation in any of steps S116-S123 straddle the data number "0" (such as the data numbers 110a, 110b or 110e, 110j used for the calculation of the difference 111a or 111e), the data number difference is corrected in steps S124-S127.

To this end, upon completion of the difference calculation in any of steps S116-S123, the CPU 25 determines whether the data number difference stored in the variable DiffCnt is larger than a value of 256 (step S124). If the data number difference is not larger than the value of 256 (NO in step S124), the process proceeds to step S126. On the other hand, if the data number difference stored in the variable DiffCnt is larger than the value of 256 (YES in step S124), the process proceeds to step S125 in which the CPU 25 subtracts a value of 512 from the data number difference stored in the variable DiffCnt and stores a resultant value into the variable DiffCnt. Subsequently, the process proceeds to step S126.

In step S126, the CPU 25 determines whether the data number difference stored in the variable DiffCnt is equal to or less than a value of −256. If the data number difference is neither equal to nor less than the value of −256 (NO in step S126), the process proceeds to step S128. On the other hand, if the data number difference stored in the variable DiffCnt is equal to or less than the value of −256 (YES in step S126), the process proceeds to step S127 in which the CPU 25 adds a value of 512 to the data number difference stored in the variable DiffCnt and stores a resultant value into the variable DiffCnt. Then, the process proceeds to step S128.

Processing in steps S128 to S133 is performed to control the voltages applied to the A-phase coil 11a and the B-phase coil 11b.

The motor drive apparatus 100 generates the largest torque when in a state in which the follow-up delay of the rotor 14 relative to the voltage signals applied to the A-phase coil 11a and the B-phase coil 11b is 90° in terms of the electrical angle of the rotor 14. Accordingly, if the follow-up delay of the rotor 14 relative to the sinusoidal voltage signals applied to the A-phase coil 11a and the B-phase coil 11b is smaller than 90° in terms of the electrical angle of the rotor 14, the CPU 25 decreases the voltages applied to the A-phase coil 11a and the B-phase coil 11b. This decreases the rotation speed of the rotor 14, thus increasing the follow-up delay of the rotor 14. On the other hand, if the follow-up delay of the rotor 14 relative to the sinusoidal voltage signals applied to the A-phase coil 11a and the B-phase coil 11b is larger than 90° in terms of the electrical angle of the rotor 14, the CPU 25 increases the voltages applied to the A-phase coil 11a and the B-phase coil 11b. This increases the rotation speed of the rotor 14, thus decreasing the follow-up delay of the rotor 14.

This embodiment is arranged to control the voltages applied to the A-phase coil 11a and the B-phase coil 11b according to the amount of follow-up delay of the rotor 14 in such a way that the follow-up delay of the rotor 14 relative to the signals applied to the A-phase coil 11a and the B-phase coil 11b is brought into a desired state.

As described above, according to this embodiment, values stored in the variable DiffCnt are obtained by expressing, in data numbers, the amount of follow-up delay of the rotor 14 relative to the sinusoidal voltage signals applied to the A-phase coil 11a and the B-phase coil 11b. The CPU 25 determines whether the follow-up delay of the rotor 14 is larger or smaller than 90° by determining whether the value stored in the variable DiffCnt is larger or smaller than "128".

In step S128, the CPU 25 determines whether a predetermined voltage control periodic time has elapsed. If the CPU 25 determines that the predetermined voltage control periodic time has elapsed (YES in step S128), the process proceeds to step S129. If the CPU 25 determines that the predetermined voltage control periodic time has not yet elapsed (NO in step S128), the process proceeds to step S134. Thus, this embodiment can control the voltages applied to the A-phase coil 11a and the B-phase coil 11b at intervals of a predetermined time irrespective of the rotation speed of the rotor 14.

In step S129, the CPU 25 determines whether the value stored in the variable DiffCnt is smaller than "128". If the CPU 25 determines that the value stored in the variable DiffCnt is smaller than "128" (YES in step S129), the process proceeds to step S130. If the CPU 25 determines that the value stored in the variable DiffCnt is not smaller than "128" (NO in step S129), the process proceeds to step S131.

Figure 14:
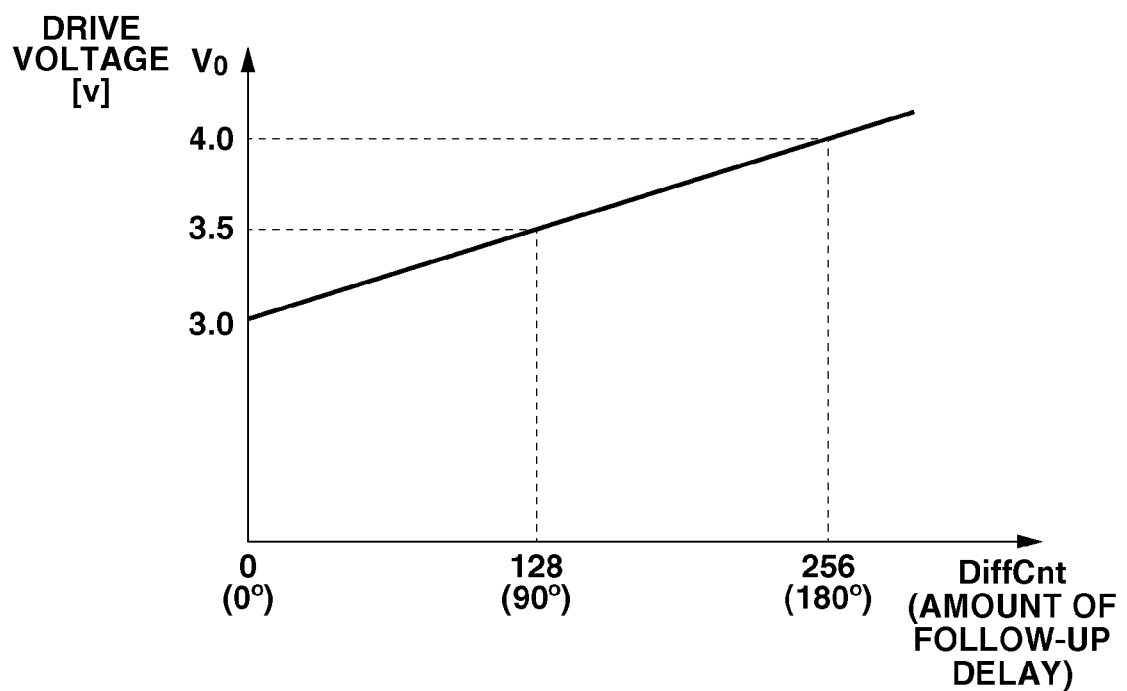
FIG. 14 is a graph showing a relation between values stored in a variable DiffCnt and drive voltages applied to an A-phase coil and a B-phase coil.

In step S130, the CPU 25 decreases the drive voltage $V_0$, which is applied by the motor driver 29 to the A-phase coil 11a and the B-phase coil 11b, according to the relation shown in FIG. 14. FIG. 14 is a graph showing a relation between values stored in the variable DiffCnt and the drive voltages $V_0$ applied to the A-phase coil 11a and the B-phase coil 11b. The CPU 25 sets the drive voltage $V_0$ according to the graph shown in FIG. 14 to decrease the drive voltage $V_0$ applied by the motor driver 29 to the A-phase coil 11a and the B-phase coil 11b.

In step S131, the CPU 25 determines whether the value stored in the variable DiffCnt is larger than "128". If the CPU 25 determines that the value stored in the variable DiffCnt is larger than "128" (YES in step S131), the process proceeds to step S132. If the CPU 25 determines that the value stored in the variable DiffCnt is not larger than "128" (NO in step S131), the process proceeds to step S133. Also, a case where it is determined in step S131 that the value stored in the variable DiffCnt is not larger than "128" corresponds to a case where the value stored in the variable DiffCnt is "128", i.e., a case where the follow-up delay of the rotor 14 is 90°.

In step S132, the CPU 25 increases the drive voltage $V_0$, which is applied by the motor driver 29 to the A-phase coil 11a and the B-phase coil 11b. The CPU 25 sets the drive voltage $V_0$ according to the graph shown in FIG. 14 to increase the drive voltage $V_0$ applied by the motor driver 29 to the A-phase coil 11a and the B-phase coil 11b.

In step S133, the CPU 25 does not change the drive voltage $V_0$ applied by the motor driver 29 to the A-phase coil 11a and the B-phase coil 11b, i.e., maintains the current drive voltage $V_0$.

In step S134, the CPU 25 determines whether the rotor 14 has reached the target stop position. If the CPU 25 determines that the rotor 14 has not yet reached the target stop position (NO in step S134), the process returns to step S108. On the other hand, if the CPU 25 determines that the rotor 14 has reached the target stop position (YES in step S134), the process proceeds to step S135. In step S135, the CPU 25 stops the progress of output of data numbers. Then, the process returns to step S105.

In this embodiment, when the predetermined voltage control periodic time has elapsed, the value stored in the variable DiffCnt changes each time the ENC0 signal or the ENC1 signal changes between high and low levels. In other words, the amount of follow-up delay of the rotor 14 is updated each time the output of the ch0 photointerrupter 103 or the ch1 photointerrupter 104 changes, so that the drive signals applied to the A-phase coil 11a and the B-phase coil 11b are set.

Similar advantageous effects can be obtained even by using a proportional-integral-derivative (PID) controller or a phase compensation filter to set the drive signals applied to the A-phase coil 11a and the B-phase coil 11b based on the amount of follow-up delay of the rotor 14 (a value stored in the variable DiffCnt).

According to the above-described process, the amount of follow-up delay of a rotor can be obtained based on a difference between a state of a drive signal at timing when an output signal is output from a signal output unit in a case where there is no follow-up delay of the rotor and a state of the drive signal at timing when an output signal is output from the signal output unit in a case where there is a follow-up delay of the rotor. Then, drive voltages applied to an A-phase coil and a B-phase coil can be controlled based on the obtained difference.

Embodiments of the invention can also be realized by a computer of a system or apparatus that reads out and executes computer executable instructions recorded on a storage medium (e.g., non-transitory computer-readable storage medium) to perform the functions of one or more of the above-described embodiment(s) of the invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096522 filed May 1, 2013, which is hereby incorporated by reference herein in its entirety.

What is claimed is:

1. A motor drive apparatus that drives a motor having a coil and a rotor that rotates when the coil is energized, comprising:

a drive unit configured to supply a sinusoidal drive voltage to the coil;

a rotation detection unit configured to detect a phase of rotation of the rotor as a first phase, wherein the first phase corresponds to a phase when the rotation detection unit detects a predetermined phase of rotation of the rotor; and a control unit configured to control the drive unit, wherein the control unit controls the drive unit to decrease, increase or maintain amplitude of the sinusoidal drive voltage such that a difference between the first phase and a second phase becomes 90 degrees, wherein the second phase is in accordance with a phase in the case without follow-up delay of rotation of the rotor for the sinusoidal drive voltage.

2. The motor drive apparatus according to claim 1, further comprising, a rotary plate configured to rotates in accordance with the rotation of the rotor, wherein the rotation detection unit detect a phase rotation of the rotor by detecting a rotation of the rotary plate.

3. The motor drive apparatus according to claim 1, wherein the number of detection times of the rotation detection unit during one revolution of the motor is less than the number of phases of the sinusoidal drive signal during one revolution of the stepping motor.

4. The motor drive apparatus according to claim 1, wherein the control unit controls the drive unit so as to decrease amplitude of the drive voltage in case where the difference between the first phase and the second phase is smaller than 90 degrees and to increase amplitude of the drive voltage in case where the difference between the first phase and the second phase is larger than 90 degrees.

5. The motor drive apparatus according to claim 1, further comprising another coil, wherein the drive unit supplies the sinusoidal drive voltage to the coils respectively.

6. A control method for a motor drive apparatus including a drive unit configured to supply a sinusoidal drive voltage to a coil of a motor, and a control unit configured to control the drive unit, the control method comprising:

detecting a phase of rotation of the rotor as a first phase by a rotation detection unit, wherein the first phase corresponds to a phase when the rotation detection unit detects a predetermined phase of rotation of the rotor; and controlling the drive unit to decrease, increase or maintain amplitude of the sinusoidal drive voltage such that a difference between the first phase and a second phase becomes 90 degrees, wherein the second phase is in accordance with a phase in the case without follow-up delay of rotation of the rotor for the sinusoidal drive voltage.

* * * * *